(12) United States Patent
Huang et al.

(10) Patent No.: US 12,730,445 B2
(45) Date of Patent: Sep. 8, 2026

(54) SYSTEMS AND METHODS FOR MONITORING AUTONOMOUS ROBOTIC LAWNMOWERS

(71) Applicant: iRobot Corporation, Bedford, MA (US)

(72) Inventors: Qunxi Huang, Somerville, MA (US); Wesley Johnson, Watertown, MA (US); Mark Edward Piana, Cambridge, MA (US); Erik Steltz, Melrose, MA (US); Benjamin Axelrod, Burlington, MA (US); Ira Renfrew, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 521 days.

(21) Appl. No.: 17/917,505

(22) PCT Filed: Mar. 22, 2021

(86) PCT No.: PCT/US2021/023496

§ 371 (c)(1),
(2) Date: Oct. 6, 2022

(87) PCT Pub. No.: WO2021/221825

PCT Pub. Date: Nov. 4, 2021

(65) Prior Publication Data

US 2023/0152817 A1 May 18, 2023

Related U.S. Application Data

(60) Provisional application No. 63/016,111, filed on Apr. 27, 2020.

(51) Int. Cl.

| | |
|---|---|
| ***G05D 1/00*** | (2024.01) |
| ***A01D 34/00*** | (2006.01) |
| ***A01D 101/00*** | (2006.01) |

(52) U.S. Cl.
CPC ......... *G05D 1/0225* (2013.01); *A01D 34/008* (2013.01); *G05D 1/0011* (2013.01); *G05D 1/0221* (2013.01); *A01D 2101/00* (2013.01)

(58) Field of Classification Search
CPC .......................... A01D 34/008; A01D 2101/00
See application file for complete search history.

(56) References Cited

U.S. PATENT DOCUMENTS

| | | | |
|---|---|---|---|
| 2008/0039974 | A1 | 2/2008 | Sandin et al. |
| 2008/0109126 | A1 | 5/2008 | Sandin et al. |

(Continued)

FOREIGN PATENT DOCUMENTS

| | | | | |
|---|---|---|---|---|
| EP | 3506039 | | 7/2019 | |
| GB | 2563347 A | * | 12/2018 | ........... A01D 34/008 |
| WO | WO 2020/027611 | | 2/2020 | |

OTHER PUBLICATIONS

International Preliminary Report on Patentability in International Appln. No. PCT/US2021/023496, mailed Nov. 10, 2022, 10 pages.

(Continued)

*Primary Examiner* — Navid Z. Mehdizadeh
*Assistant Examiner* — Shelley Marie Osterhout
(74) *Attorney, Agent, or Firm* — MASCHOFF BRENNAN

(57) ABSTRACT

A user device, such as a smartphone or a tablet computer, can provide a user with information pertaining to operations of an autonomous robotic lawnmower to assist the user with monitoring the operations of the robotic lawnmower and with setting up the autonomous robotic lawnmower. For example, the user device can present example lawn shapes and recommended locations of beacons suitable for these lawn shapes, can indicate the quantity of beacons detected by the autonomous robotic lawnmower, can be used to establish a region on a lawn where the autonomous robotic lawnmower performs a particular behavior, can be used to (Continued)

select a grass height that the autonomous robotic lawnmower cuts the lawn, and can be taught a particular path to take when returning to a docking station to charge the autonomous robotic lawnmower.

17 Claims, 25 Drawing Sheets

(56) References Cited

U.S. PATENT DOCUMENTS

| | | | | |
|---|---|---|---|---|
| 2016/0100522 | A1* | 4/2016 | Yamauchi | G05D 1/0219<br>701/25 |
| 2016/0174459 | A1 | 6/2016 | Balutis et al. | |
| 2016/0363933 | A1* | 12/2016 | Balutis | G05D 1/0234 |
| 2017/0020064 | A1* | 1/2017 | Doughty | A01D 34/008 |
| 2017/0026818 | A1 | 1/2017 | Beaulieu et al. | |
| 2018/0143634 | A1* | 5/2018 | Ott | G05D 1/0297 |
| 2019/0196483 | A1* | 6/2019 | Uemura | A01D 34/008 |
| 2020/0047343 | A1* | 2/2020 | Bal | B25J 9/1689 |
| 2021/0011485 | A1 | 1/2021 | Chiappetta | |

OTHER PUBLICATIONS

International Search Report and Written Opinion in International Appln. No. PCT/US2021/023496, mailed Aug. 12, 2021, 17 pages.

Invitation to Pay Additional Fees in International Appln. No. PCT/US2021/023496, mailed Jun. 15, 2021, 12 pages.

* cited by examiner

SYSTEMS AND METHODS FOR MONITORING AUTONOMOUS ROBOTIC LAWNMOWERS

CROSS-REFERENCE TO RELATED APPLICATIONS

This application is a National Stage Application under 35 U.S.C. § 371 and claims the benefit of International Application No. PCT/US2021/023496, filed Mar. 22, 2021, which application claims the benefit under 35 U.S.C. § 119 (e) of U.S. Patent Application No. 63/016,111, filed Apr. 27, 2020. The disclosure of the foregoing applications are incorporated herein by reference in their entirety for all purposes.

TECHNICAL FIELD

This specification relates to systems and methods for monitoring autonomous robotic lawnmowers.

BACKGROUND

Autonomous mobile robots can be operated to autonomously perform a task in an environment. For example, autonomous robotic lawnmowers are types of autonomous mobile robots. An autonomous robotic lawnmower can autonomously mow a lawn and then return to a docking station to charge a battery of the autonomous robotic lawnmower.

SUMMARY

A user device, such as a smartphone or a tablet computer, can provide a user with information pertaining to operations of an autonomous robotic lawnmower to assist the user with monitoring the operations of the robotic lawnmower and with setting up the autonomous robotic lawnmower. For example, the user device can present example lawn shapes and recommended locations of beacons suitable for these lawn shapes, can indicate the quantity of beacons detected by the autonomous robotic lawnmower, can be used to establish a region on a lawn where the autonomous robotic lawnmower performs a particular behavior, can be used to select a grass height that the autonomous robotic lawnmower cuts the lawn, and can be taught a particular path to take when returning to a docking station to charge the autonomous robotic lawnmower.

In one aspect, a method includes presenting, on a user interface of a mobile device in communication with an autonomous robotic lawnmower, a representation of a first potential shape of a lawn, and first indicators of first recommended locations for beacons configured to communicate with the autonomous robotic lawnmower, and presenting, on the user interface, a representation of a second potential shape of the lawn, and second indicators of second recommended locations for the beacons.

In some implementations, the first indicators can be positioned along a perimeter of the representation of the first potential shape of the lawn, and the second indicators can be positioned along a perimeter of the representation of the second potential shape of the lawn.

In some implementations, the first indicators can be overlaid on the representation of the first potential shape of the lawn, and the second indicators can be overlaid on the representation of the second potential shape of the lawn.

In some implementations, the method can further include presenting a third indicator of a first recommended location of a docking station for the autonomous robotic lawnmower, the third indicator overlaid on the representation of the first potential shape of the lawn, and presenting a fourth indicator of a second recommended location of the docking station for the autonomous robotic lawnmower, the fourth indicator overlaid on the representation of the second potential shape of the lawn.

In some implementations, a quantity of the first indicators can be based on the first potential shape of the lawn, and a quantity of the second indicators can be based on the second potential shape of the lawn.

In another aspect, a method includes receiving, by a mobile device from an autonomous robotic lawnmower in an environment, data indicative of a quantity of beacons detected by the autonomous robotic lawnmower, presenting, on a user interface of the mobile device, an indicator of the quantity of beacons detected by the autonomous robotic lawnmower, and updating the indicator of the quantity of beacons detected by the autonomous robotic lawnmower as the quantity of beacons detected by the autonomous robotic lawnmower changes during movement of the autonomous robotic lawnmower about the environment.

In some implementations, the method can include presenting, on the user interface of the mobile device, a recommendation to place a beacon in the environment in response to the quantity of beacons being below a threshold quantity.

In some implementations, the threshold quantity can be three.

In some implementations, the indicator can have a first color if the quantity of beacons is no fewer than the threshold quantity, and the indicator can have a second color if the quantity of beacons is fewer than the threshold quantity.

In some implementations, receiving the data indicative of the quantity of beacons detected by the autonomous robotic lawnmower can include receiving the data indicative of the quantity of beacons detected by the autonomous robotic lawnmower during a test operation of the autonomous robotic lawnmower in the environment.

In some implementations, the method can include during the test operation of the autonomous robotic lawnmower in the environment, presenting, on the user interface of the mobile device, a user instruction to move the autonomous robotic lawnmower along a perimeter of a lawn in the environment, and presenting, on the user interface of the mobile device, a user instruction to move the autonomous robotic mower through a central region of the lawn in the environment.

In some implementations, the method can include presenting, on the user interface of the mobile device, a test completion indicator in response to the autonomous robotic lawnmower covering at least 90% of a lawn in the environment without the quantity of beacons detected by the autonomous robotic lawnmower being less than a threshold quantity.

In another aspect, a method includes receiving, by a mobile device from an autonomous robotic lawnmower, mapping data collected by the autonomous robotic lawnmower as the autonomous robotic lawnmower is navigated about a lawn, presenting, on a user interface of the mobile device, a representation of a map of the lawn based on the mapping data, and transmitting, by the mobile device to the autonomous robotic lawnmower, data indicative of a user-selected behavior control zone to cause the autonomous robotic lawnmower to initiate a behavior in response to encountering the user-selected behavior control zone as the autonomous robotic lawnmower navigates about the lawn during a mowing operation.

In some implementations, the method can include presenting, on the user interface of the mobile device, a representation of a recommended behavior control zone overlaid on the representation of the map of the lawn.

In some implementations, the recommended behavior control zone can be selected based on a location of an object on the lawn detected by the autonomous robotic lawnmower as the autonomous robotic lawnmower is navigated about the lawn.

In some implementations, the user-selected behavior control zone can be based on the recommended behavior control zone.

In some implementations, the user-selected behavior control zone can correspond to a user-selected keep out zone, and the behavior can be an avoidance behavior in which the autonomous robotic lawnmower avoids the user-selected keep out zone.

In some implementations, the user-selected behavior control zone can correspond to a user selection of a portion of the representation of the map of the lawn.

In some implementations, the user selection of the portion of the representation of the map of the lawn can be a user selection of a perimeter of the user-selected behavior control zone.

In some implementations, the method can include receiving, by the mobile device from an autonomous robotic lawnmower, perimeter data as the autonomous robotic lawnmower is navigated along a perimeter of the user-selected behavior control zone, and presenting, on the user interface of the mobile device, a representation of the perimeter of the user-selected behavior control zone. Transmitting the data indicative of the user-selected behavior control zone can include transmitting the data indicative of the user-selected behavior control zone in response to a user confirmation.

In another aspect, a method includes receiving, by a mobile device, an instruction indicative of a user-selected grass height, and transmitting, from the mobile device to an autonomous robotic lawnmower, data indicative of the user-selected grass height to cause the autonomous robotic lawnmower to move a cutting element of the autonomous robotic lawnmower relative to a lawn to a height corresponding to the user-selected grass height such that the autonomous robotic lawnmower cuts grass on the lawn to the user-selected grass height during a mowing operation.

In some implementations, the method can include presenting, on a user interface of the mobile device, an indicator of a range of grass heights. The user-selected grass height can be within the range of grass heights. In some implementations, the indicator can be a first indicator, and the method can include presenting, on the user interface of the mobile device, a second indicator overlaid on the first indicator, the second indicator indicating the user-selected grass height relative to the range of grass heights represented by the first indicator.

In some implementations, the method can include presenting, on a user interface of the mobile device, an indicator of the user-selected grass height.

In some implementations, the indicator can be a numerical indicator of the user-selected grass height.

In some implementations, the method can include receiving, by the mobile device from the autonomous robotic lawnmower, data indicative of a current grass height on the lawn, and presenting, on a user interface of the mobile device, an indicator of the current grass height.

In another aspect, a method includes generating, by an autonomous robotic lawnmower during a teach operation, path data as the autonomous robotic lawnmower is navigated along a path to a docking station for the autonomous robotic lawnmower, and initiating, by the autonomous robotic lawnmower, a docking operation in which the autonomous robotic lawnmower autonomously moves along the path to the docking station to dock with the docking station.

In some implementations, the path data can be indicative of a start point of the path, and in the docking operation, the autonomous robotic lawnmower can be navigated to the start point and then is navigated along the path to the docking station. In some implementations, the method can include receiving, by the autonomous robotic lawnmower from a mobile device, an instruction to initiate the teach operation. The start point can correspond to a point at which the autonomous robotic lawnmower initiates the teach operation.

In some implementations, the method can include transmitting, by the autonomous robotic lawnmower to a mobile device, data indicative of a battery level of the autonomous robotic lawnmower and a quantity of beacons detected by the autonomous robotic lawnmower as the autonomous robotic lawnmower, during the teach operation, is navigated along the path to the docking station.

In some implementations, generating the path data as the autonomous robotic lawnmower is navigated along the path to the docking station can include generating the path data as the autonomous robotic lawnmower is manually navigated along the path to the docking station.

In some implementations, the method can include receiving, by the autonomous robotic lawnmower from a remote controlling device, one or more instructions to navigate the autonomous robotic lawnmower along the path to the docking station during the teach operation.

In some implementations, the method can include navigating, by the autonomous robotic lawnmower during the teach operation, along the path to the docking station, and storing the path data in response to receiving a user confirmation.

In another aspect, a method includes transmitting, by a mobile device to an autonomous robotic lawnmower, an instruction to initiate a teach operation, receiving, by the mobile device, path data generated by the autonomous robotic lawnmower as the autonomous robotic lawnmower is navigated along a path to a docking station for the autonomous robotic lawnmower, and presenting, on a user interface of the mobile device, a representation of the path to the docking station.

In some implementations, the method can include presenting, on the user interface of the mobile device, an instruction to navigate the autonomous robotic lawnmower along the path during the teach operation from a start point positioned at least a threshold distance from a perimeter of a lawn on which the autonomous robotic lawnmower is positioned.

In some implementations, the method can include presenting, on the user interface of the mobile device, indicators of a battery level of the autonomous robotic lawnmower and a quantity of beacons detected by the autonomous robotic lawnmower as the autonomous robotic lawnmower, during the teach operation, is navigated along the path to the docking station.

In some implementations, the method can include presenting, on the user interface of the mobile device, a representation of a map of an environment of autonomous robotic lawnmower. The representation of the path can be overlaid on the representation of the map.

In some implementations, the method can include after receiving the path data generated by the autonomous robotic lawnmower, transmitting, by the mobile device to the autonomous robotic lawnmower, an instruction to move along the path during the teach operation, receiving, by the mobile device, a user confirmation of the path, and then transmitting, by the mobile device to the autonomous robotic lawnmower, data indicative of the user confirmation to cause the autonomous robotic lawnmower to store the path data.

In some implementations, the method can include transmitting, by the mobile device to the autonomous robotic lawnmower, one or more instructions to move the autonomous robotic lawnmower along the path to generate the path data during the teach operation.

Advantages of the foregoing and of the implementations described herein may include, but are not limited to, those described below and herein elsewhere.

First, the implementations described herein can improve the performance of the robotic lawnmower. For example, the beacons detected by and used by the robotic lawnmower can be placed in positions that allow the robotic lawnmower to more easily determine its location on the lawn. This in turn can allow the robotic lawnmower to more efficiently mow the lawn. Furthermore, the beacons can be placed about the lawn in a more efficient manner. For example, the user device can provide guidance to the user to place the beacons about the lawn without using an excessive number of beacons.

In some implementations, the user can exercise more control over the mowed grass height of the lawn. The robotic lawnmower can cut the grass on the lawn to a height selected by the user, e.g., using the user device. Implementations of certain methods and systems described herein can allow the user to select the grass height to which the autonomous robotic lawnmower cuts the lawn without having to manually adjust the blade height of the autonomous robotic lawnmower.

In some implementations, the robotic lawnmower can be taught paths along which to travel to allow the autonomous robotic lawnmower to more efficiently travel around the lawn. For example, certain parts of the autonomous robotic lawnmower's travel could benefit from the autonomous robotic lawnmower moving to certain positions or moving at certain angles. The taught paths can allow the autonomous robotic lawnmower to achieve this precision.

Second, the implementations described herein can improve the user's ability to monitor and control the operations of the robotic lawnmower. The user device can provide the user with information pertaining to the beacons detectable by the robotic lawnmower. The user can monitor the number of beacons that the robotic lawnmower detects as the autonomous robotic lawnmower travels the lawn. Furthermore, the user can use the user device to control the behaviors of the robotic lawnmower, particularly when the robotic lawnmower travels to certain user-selected regions on the lawn.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
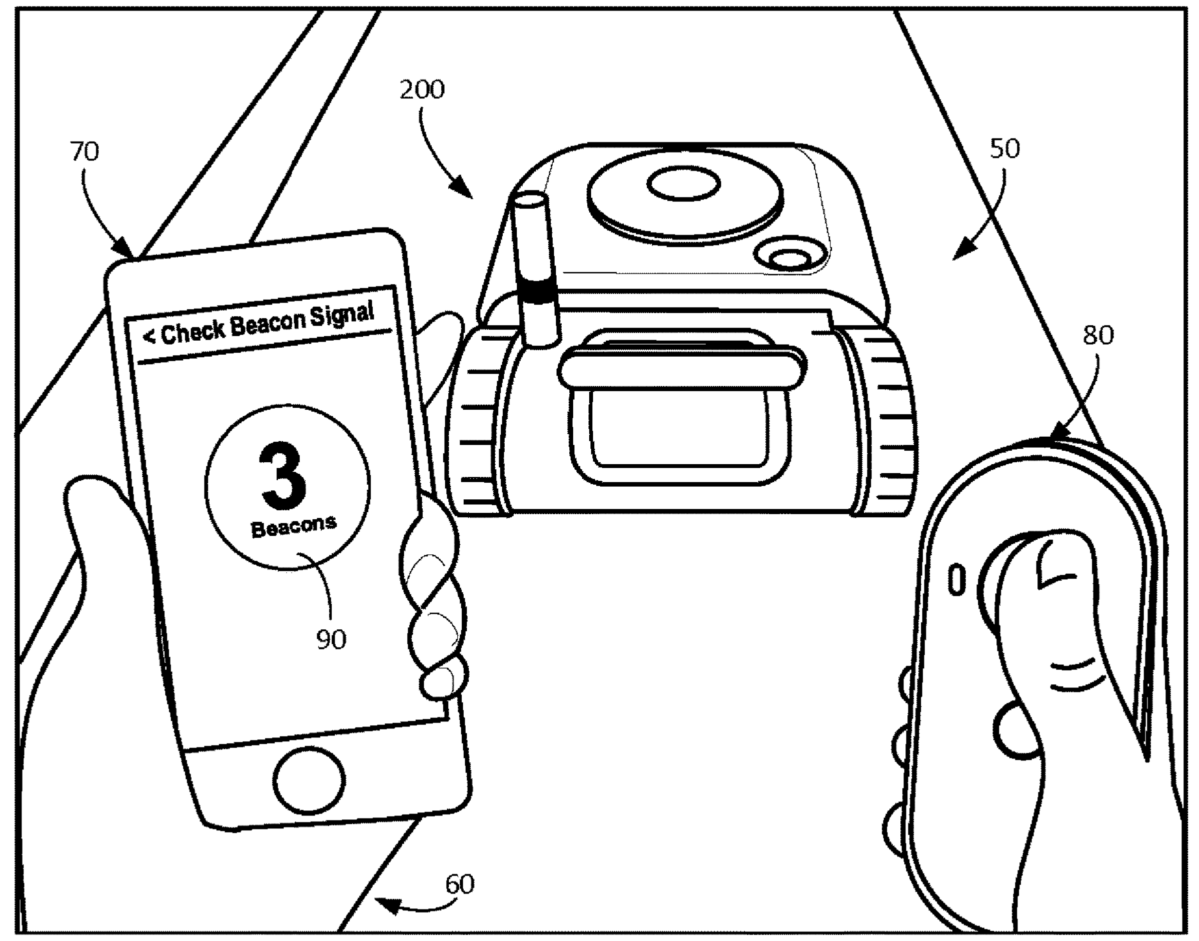
FIG. 1 illustrates an autonomous robotic lawnmower system in which a user monitors and controls an autonomous robotic lawnmower.
Figure 2:
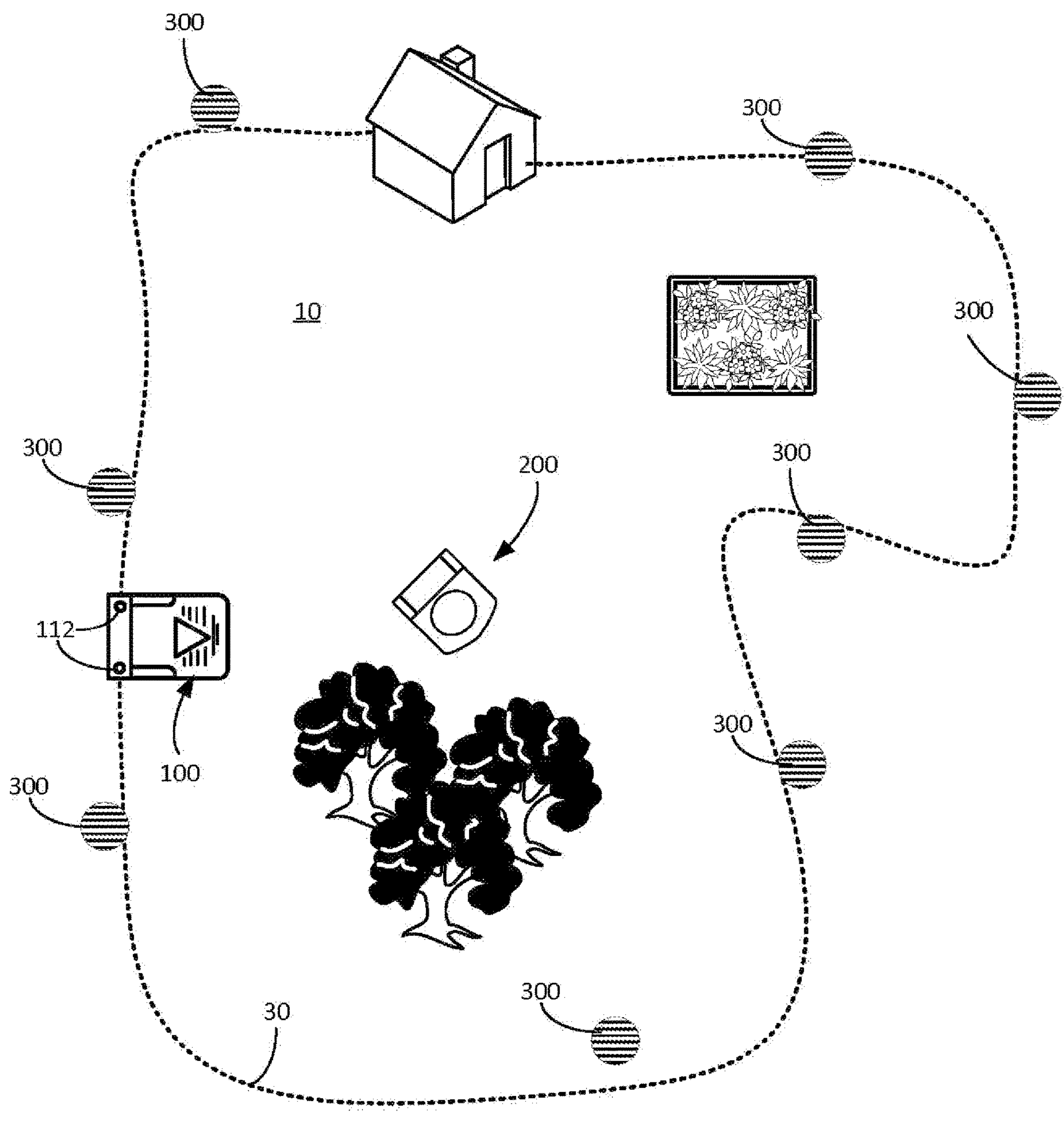
FIG. 2 is a top view of an environment including an autonomous robotic lawnmower.

FIG. 1 illustrates an autonomous robotic lawnmower system 50 in which a user 60 can operate one or more user devices to monitor and control an autonomous robotic lawnmower 200 and its operations, and to receive guidance from the one or more user devices for operating and controlling the robotic lawnmower 200. The one or more user devices can include a user device 70 and a user device 80. In the example shown in FIG. 70, the user device 70 is a smartphone, and the user device 80 is a remote control. Referring to FIG. 2, the robotic lawnmower 200 can move about a mowable area 10 to cut grass on the mowable area 10, e.g., a lawn, a field, a yard, or another appropriate mowable area. Between mowing operations, the robotic lawnmower 200 can return to a docking station to recharge a battery of the robotic lawnmower 200.

As illustrated in FIG. 1, the user device 70 can present a visual indicator 90 of a quantity of beacons detectable by the robotic lawnmower 200. Beacons 300 located in an environment are detectable by the robotic lawnmower 200 to allow the robotic lawnmower 200 to determine its location within the environment. The indicator 90 can thus allow a user to determine whether the robotic lawnmower 200 can detect a sufficient number of the beacons 300 for the robotic lawnmower 200 to accurately and precisely determine the location of the robotic lawnmower 200.

Figure 7:
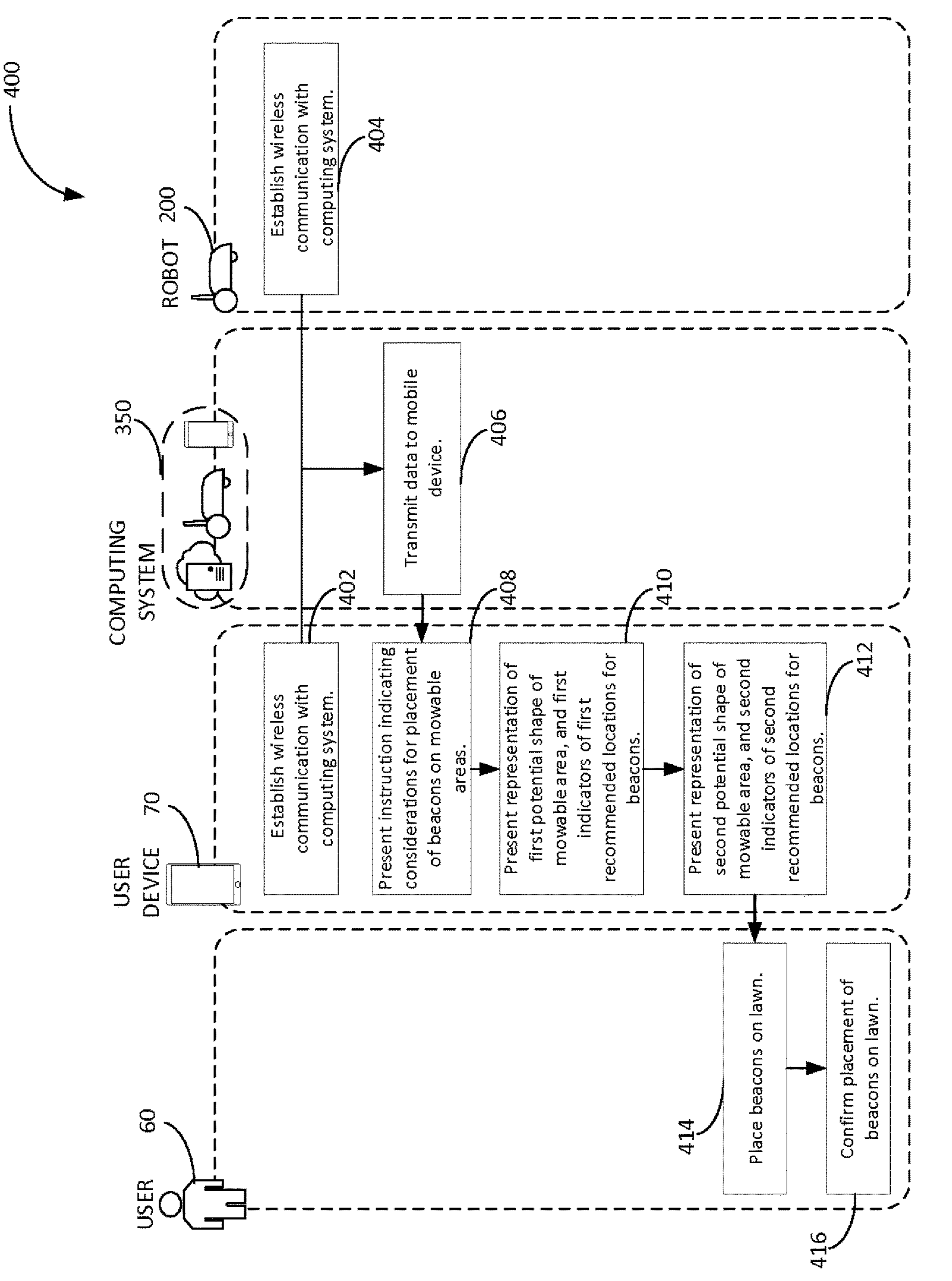
FIG. 7 is a flowchart of a process of providing recommended beacon locations.
Figure 8B:
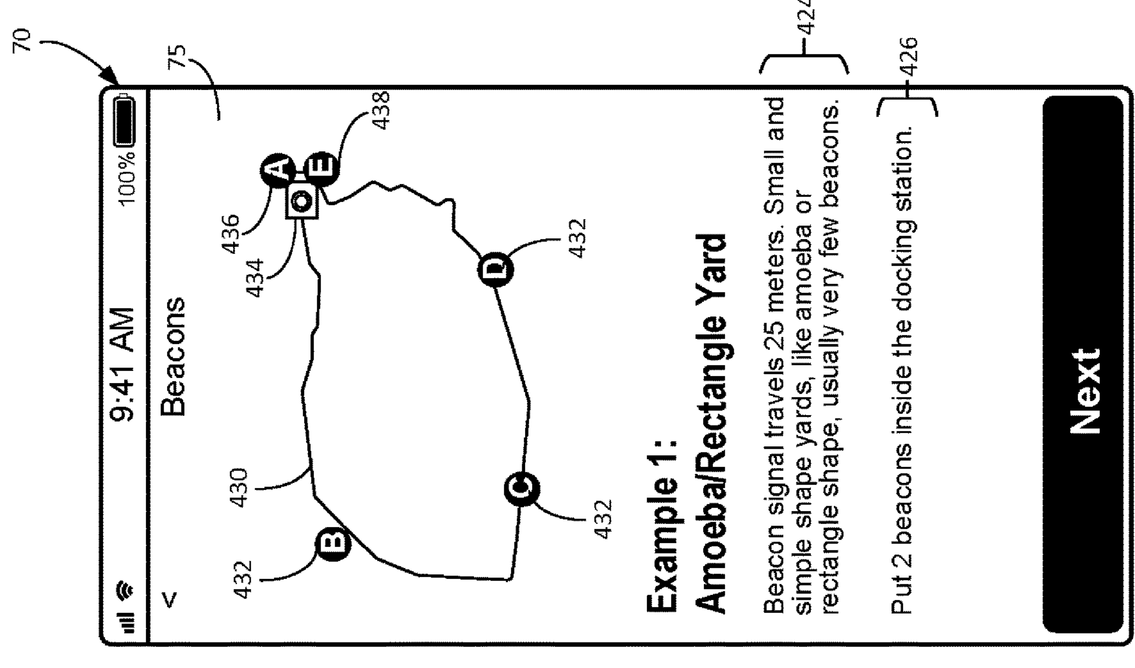
FIGS. 8A-8D are illustrations of a user interface during a process of providing recommended beacon locations.
Figure 8A:
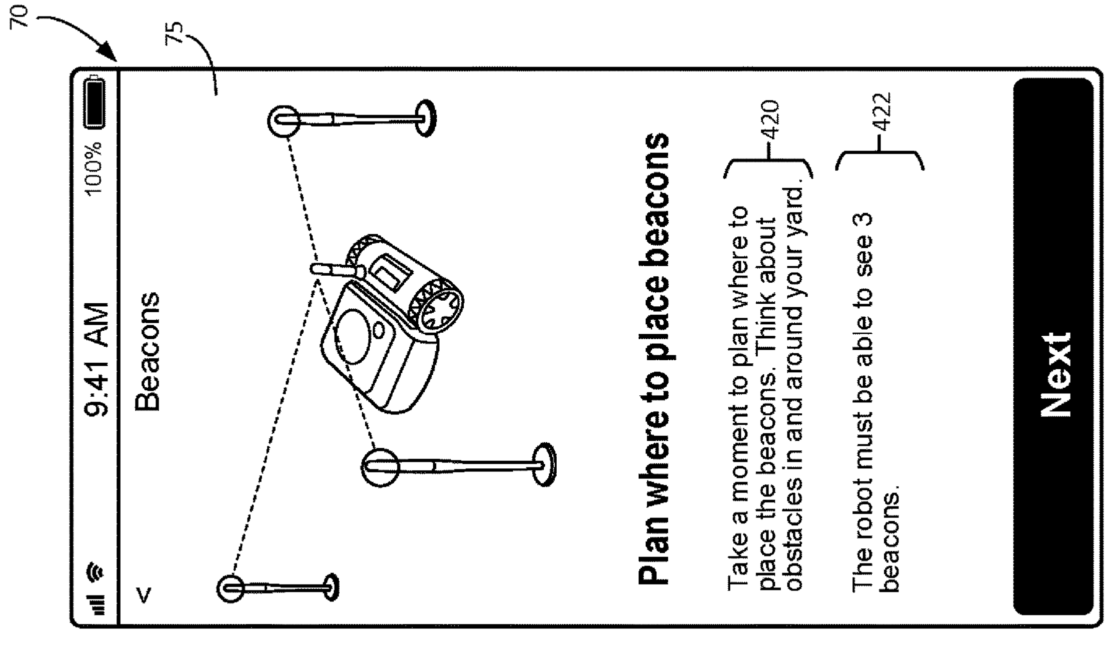
Figures 8C, 8D:
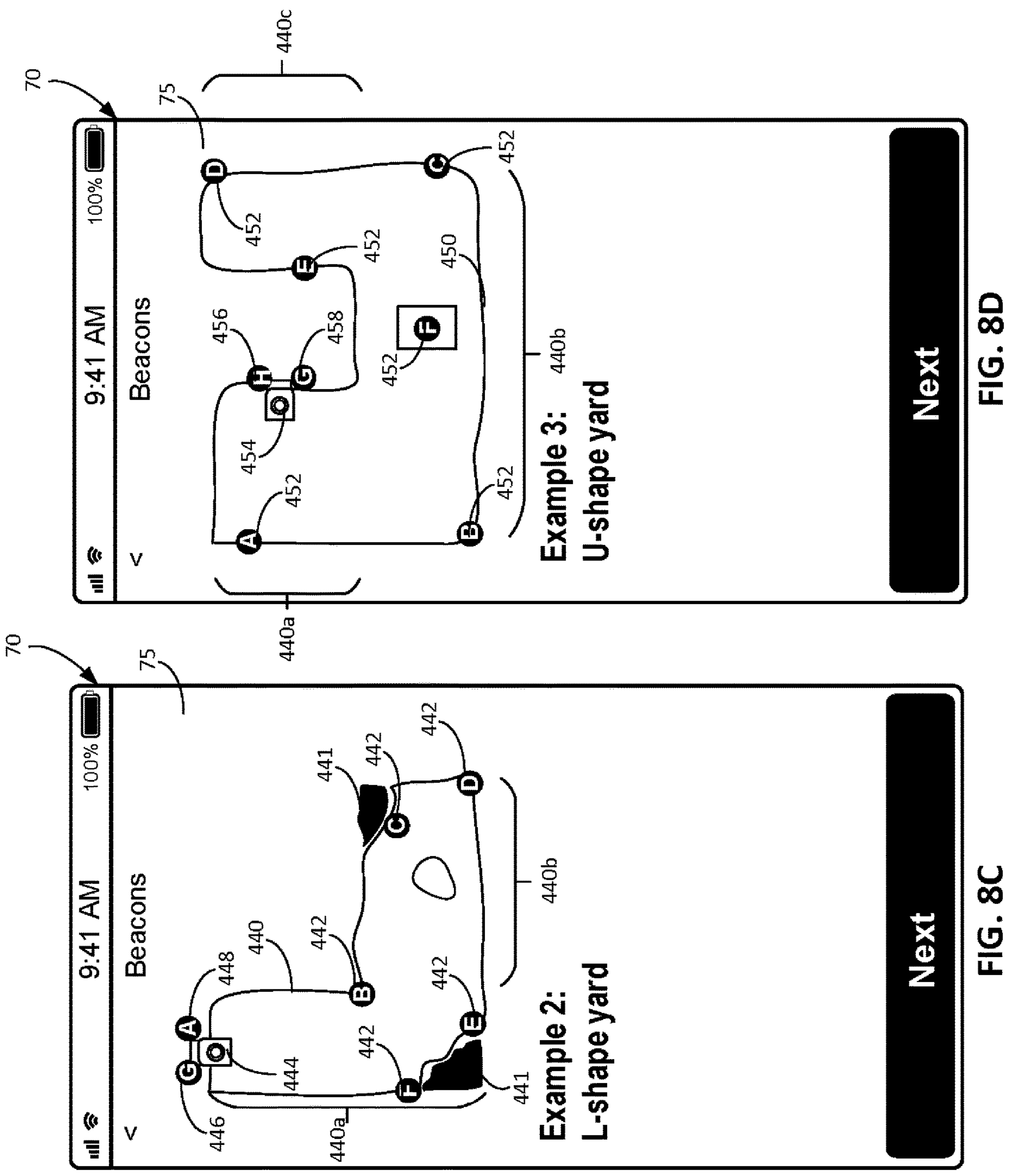
Figure 14:
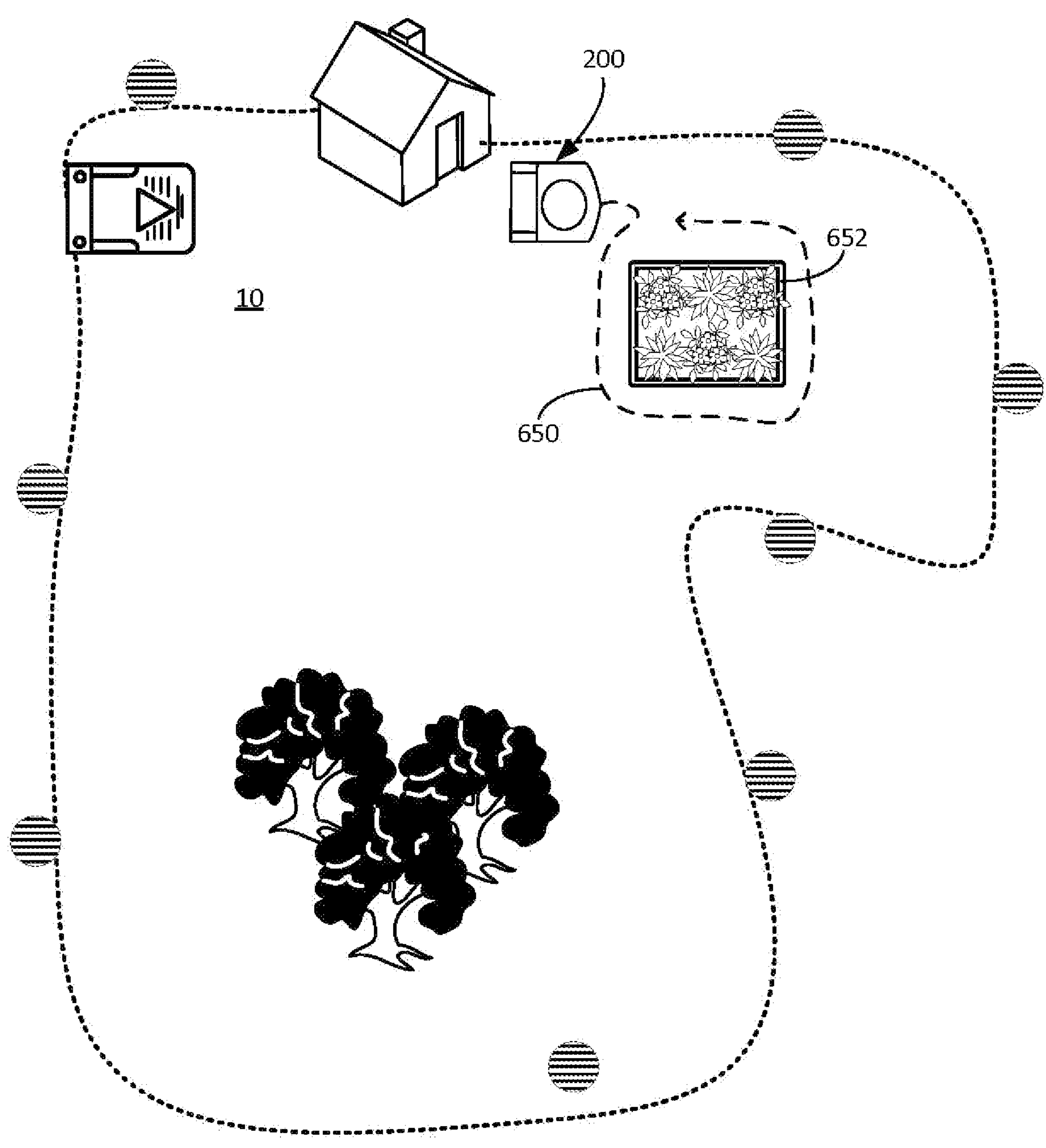
FIG. 14 is a top view of an environment including an autonomous robotic lawnmower during a process of establishing a behavior control zone for the autonomous robotic lawnmower.
Figure 15:
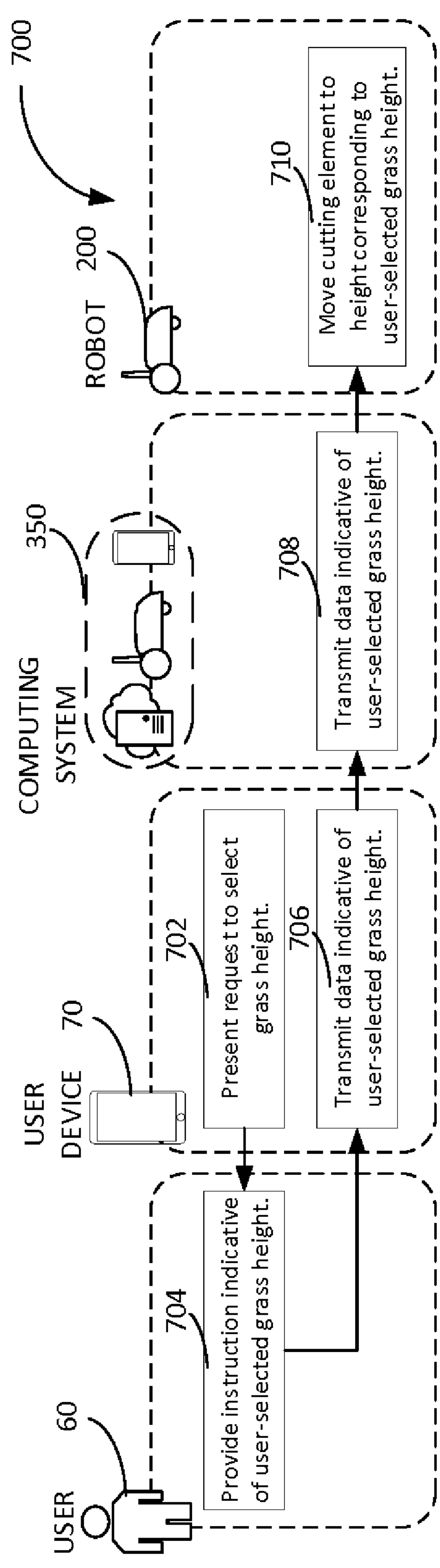
FIG. 15 is a flowchart of a process of setting a grass height to which an autonomous robotic lawnmower cuts grass on a lawn.
Figure 16:
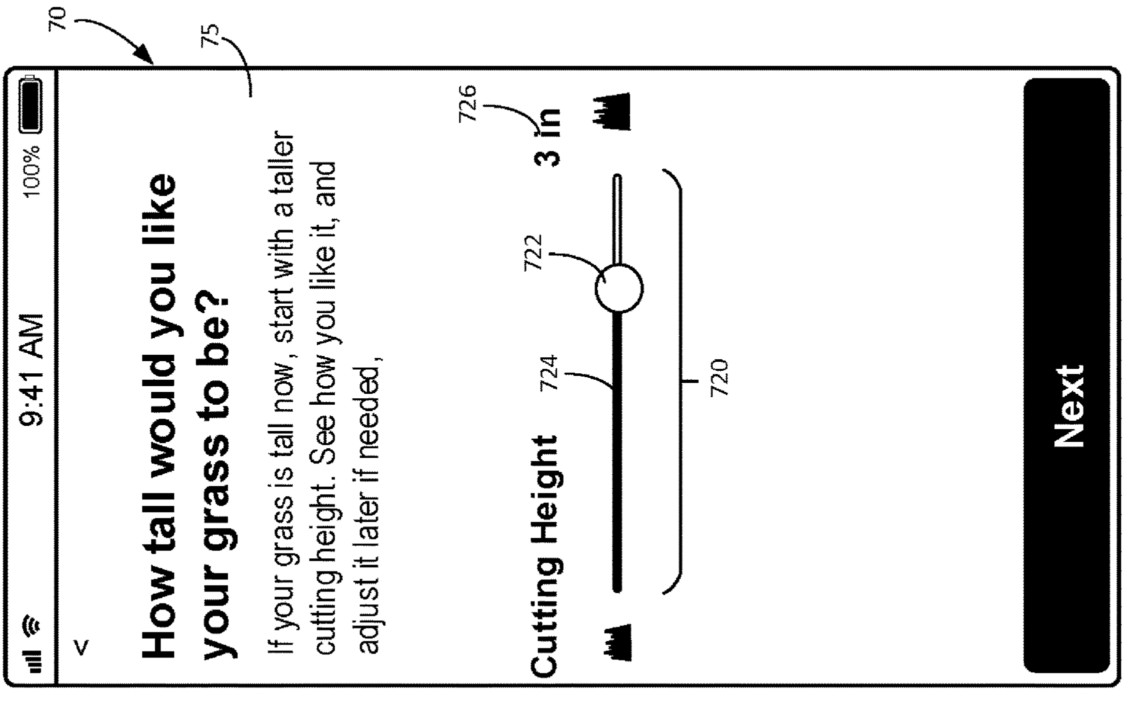
FIG. 16 is an illustration of a user interface during a process of setting a grass height to which an autonomous robotic lawnmower cuts grass on a mowable area.

As described herein, aside from providing the user 60 with information pertaining to the quantity of the beacons 300 detected by the robotic lawnmower 200 (e.g., as illustrated in FIGS. 9-11B), the autonomous robotic lawnmower system 50 can facilitate other processes that give the user 60 the ability to control and monitor the robotic lawnmower 200. For example, the autonomous robotic lawnmower system 50 can allow the user 60 to operate and monitor the robotic lawnmower 200, the beacons 300, a docking station 100 (shown in FIG. 2), and other devices related to the operations of the robotic lawnmower 200. The one or more user device can be used to recommend locations for beacons (e.g., as illustrated in FIGS. 7-8D), to establish behavior control zones that can trigger certain behaviors for the robotic lawnmower 200 (e.g., as illustrated in FIGS. 12-14), to select a grass height to which the robotic lawnmower 200 cuts grass on the mowable area 10 (e.g., as illustrated in FIGS. 15-16), and to teach a path for the robotic lawnmower 200 to move to the docking station 100 and dock with the docking station 100.

Example Autonomous Robotic Lawnmowers

Figure 3A:
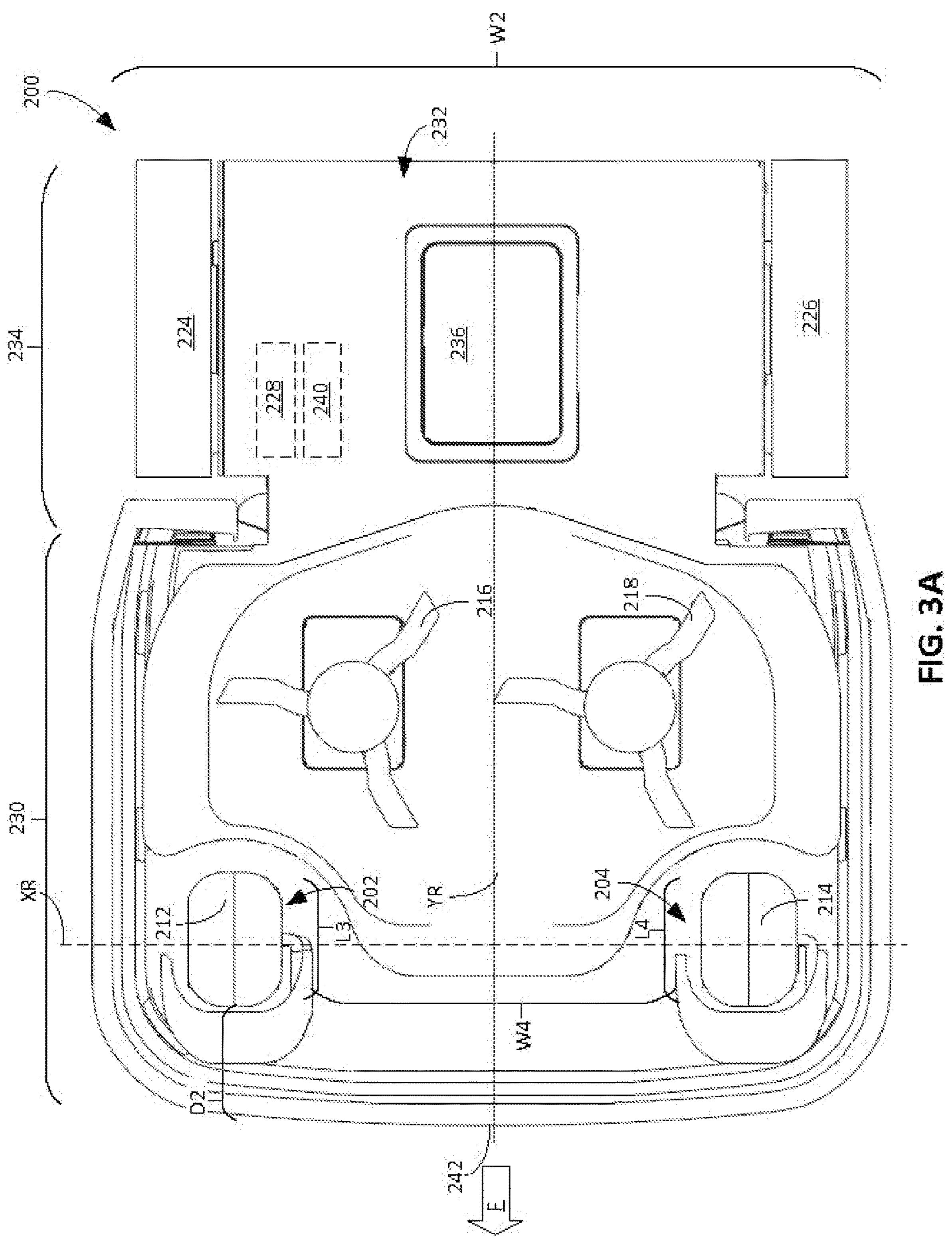
FIGS. 3A and 3B are bottom and front views, respectively, of an autonomous robotic lawnmower.
Figure 3B:
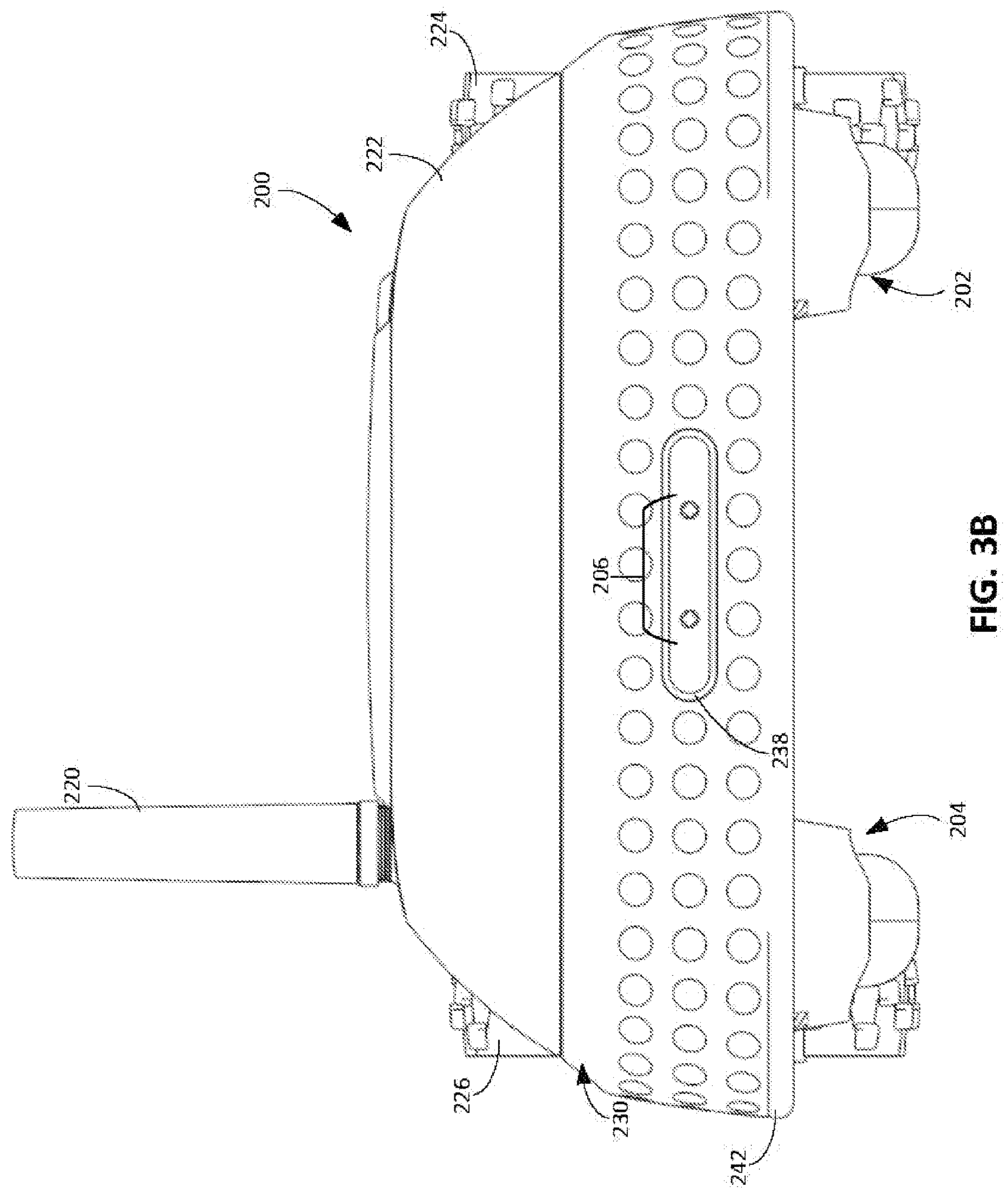

FIGS. 3A and 3B illustrate an example of the robotic lawnmower 200. The robotic lawnmower 200 includes a body 222 that can include one or more interconnected structural assemblies, e.g., one or more of a bumper, a chassis, a cutting deck, or other structural assembly.

The wheel assemblies 202, 204 are located along a bottom portion 232 of the robotic lawnmower 200, e.g., along a bottom portion of the body 222. The wheel assemblies 202, 204 are left and right wheel assemblies 202, 204. When directional terms "left" and "right" are used herein in reference to an element of the robotic lawnmower 200 or to an element of the docking station 100, the terms "left" and "right" refer to the "left" direction from the perspective of the robotic lawnmower 200 and the "right" direction from the perspective of the robotic lawnmower 200. When directional terms "forward," "front," "rearward," or "rear" are used herein in reference to an element of the robotic lawnmower 200 or to an element of the docking station 100, the terms "forward," "front," "rearward," or "rear" refer to directions from the perspective of the device, e.g., the robotic lawnmower 200 or the docking station 100, that includes the element.

In the example depicted in FIGS. 3A and 3B, the wheel assemblies 202, 204 are caster wheel assemblies positioned along a forward portion 230 of the robotic lawnmower 200, e.g., along a forward portion of the body 222 of the robotic lawnmower 200. The wheels 212, 214 are not actively driven.

In addition to including the wheel assemblies 202, 204, the robotic lawnmower 200 can include one or more drive wheels. For example, as shown in FIG. 3A, the robotic lawnmower 200 can include a left drive wheel 224 and a right drive wheel 226. The drive wheels 224, 226 are driven by one or more actuators, e.g., motors. The drive wheels 224, 226, as shown in the example of FIG. 3A, are positioned along a rearward portion 234 of the robotic lawnmower 200, e.g., along a rearward portion of the body 222. For example, the drive wheels 224, 226 are mounted to the rearward portion of the body 222. The drive wheels 224, 226 are positioned proximate to rearward corner portions of the robotic lawnmower 200, and the wheel assemblies 202, 204 are positioned proximate to forward corner portions of the robotic lawnmower 200. The drive wheels 224, 226 can be driven to move the robotic lawnmower 200 during its operations, e.g., during a docking operation, a teach operation, a test operation, a mowing operation, or another robotic lawnmower operation as described herein.

The robotic lawnmower 200 includes one or more cutting assemblies operable to mow vegetation on the mowable area 10 (shown in FIG. 2). In the example shown in FIG. 3A, the robotic lawnmower includes the cutting assemblies 216, 218. The cutting assemblies 216, 218 include blades and are rotatable such that the blades can cut the vegetation on the mowable area. In some implementations, a height of the cutting assemblies 216, 218 can be adjustable. Heights of the cutting assemblies 216, 218, in some implementations, can be independently adjustable. The cutting assemblies 216, 218 can be vertically movable away from the mowable area 10. The cutting assemblies 216, 218 can be mounted to a cutting deck of the body 222, and the cutting deck can be movable vertically relative to a remainder of the body 222 such that the cutting deck with the cutting assemblies 216, 218 can be moved away from the mowable area 10. For example, the robotic lawnmower 200 can include a motor that, when driven, moves the cutting deck in a vertical direction. Referring also to FIG. 2, the robotic lawnmower 200 can mow the mowable area 10 during the mowing operation. During the mowing operation, the robotic lawnmower 200 autonomously navigates about the mowable area 10 while cutting vegetation, e.g., grass, weeds, or other vegetation, in the mowable area 10. The robotic lawnmower 200 cuts the vegetation with one or more cutting assemblies, e.g., cutting assemblies 216, 218 shown in FIG. 3A.

The robotic lawnmower 200 includes electrical circuitry. For example, a controller 228 of the robotic lawnmower 200 operates the one or more actuators to control the drive wheels 224, 226 and thereby navigate the robotic lawnmower 200 about the mowable area 10. The robotic lawnmower 200 further includes a battery 236 to store energy usable to allow the robotic lawnmower 200 to navigate about the mowable area 10 while being untethered from an energy source, e.g., untethered from a generator, power grid, or other stationary energy source. The battery 236 is mounted to the bottom portion of the robotic lawnmower 200. The battery 236 receives energy from a docking station during a charging operation, e.g., while the robotic lawnmower 200 is docked with the docking station 100, through the electrical connector 206. As described herein, the robotic lawnmower 200 can dock with the docking station 100 during a docking operation. Referring to FIG. 3B, the electrical connector 206 is positioned on the forward portion 230 of the robotic lawnmower 200. For example, the electrical connector 206 can be positioned along a forward side portion of the robotic lawnmower 200. The electrical connector 206 is positioned along the longitudinal axis YR (shown in FIG. 3A) and extends outwardly and forwardly from the body 222 of the robotic lawnmower 200. The longitudinal axis YR can be, for example, a central axis of the robotic lawnmower 200 that is aligned with the forward drive direction F of the robotic lawnmower 200. The electrical connector 206 can extend outwardly through an opening 238 along the body 222 of the robotic lawnmower 200.

Other electrical circuitry of the robotic lawnmower 200 can include other components. For example, the robotic lawnmower 200 can include a memory storage element 240 and a sensor system with one or more electrical sensors. The sensor system, as described herein, can generate a signal indicative of a current location of the robotic lawnmower 200, and can generate signals indicative of locations of the robotic lawnmower 200 as the robotic lawnmower 200 travels along the mowable area 10. The sensor system can also generate mapping data that can be used to produce a map of the mowable area. The controller 228 is configured to execute instructions to perform one or more operations as described herein. The memory storage element 240 is accessible by the controller 228 and disposed within the body 222. The one or more electrical sensors are configured to detect features in an environment of the robotic lawnmower 200. The controller 228 can also communicate with the sensor system to determine the location of the robotic lawnmower 200 relative to the mowable area 10 and thereby navigate the robotic lawnmower 200 during the mowing operation or to navigate the robotic lawnmower 200 during the docking operation. The controller 228 can store data collected during operations of the robotic lawnmower 200.

To navigate relative to the mowable area 10, the robotic lawnmower 200 can use the sensor system to detect the beacons 300 (shown in FIG. 2). For example, the sensor system can include a detection system 220 capable of detecting signals emitted by the beacons 300. The detection system 220 can be an antenna responsive to the signals emitted by the beacons 300. The signals can be wireless signals such as, for example, radiofrequency signals (e.g., ultra-wideband signals, wideband signals, WiFi signals, or other radiofrequency signals), magnetic signals, or other appropriate wirelessly transmitted signals. The detection system 220 can include a single transceiver, or multiple transceivers. In some implementations, the detection system 220 includes four transceivers for detecting the signals emitted by the beacons 300. The robotic lawnmower 200 can then determine a location of the robotic lawnmower 200 relative to the mowable area 10 based on the detected signals. For example, the robotic lawnmower 200 can determine a time-of-flight of each of the signals and thereby triangulate the location of the robotic lawnmower 200 relative to the beacons 20 and relative to the mowable area 10.

In further implementations, prior to navigation of the robotic lawnmower 200 about the mowable area 10, a boundary 30 of the mowable area 10 can be identified. For example, the robotic lawnmower 200 can be trained to identify the boundary 30. In some examples, in the boundary training operation, the robotic lawnmower 200 is manually moved about the boundary 30 while the robotic lawnmower 200 detects the signals emitted by the beacons 20, e.g., using the detection system 220. A user can manually move the robotic lawnmower 200 by pulling, pushing, or otherwise manually interacting with the robotic lawnmower 200 to move the robotic lawnmower 200 about the boundary 30. In other examples, the user can drive the robotic lawnmower 200 by interacting with a computing device configured to transmit movement commands to the robotic lawnmower 200, e.g., a personal computer, a mobile device, a remote controller, or another computing device. In examples in which the robotic lawnmower 200 identifies the boundary 30 prior to navigating about the mowable area 10 during the mowing operation, the robotic lawnmower 200 determines its location relative to the mowable area 10 during the mowing operation based on data indicative of the boundary 30 that are collected during the training operation.

The sensor system can include one or more cliff sensors disposed along the bottom portion 232 of the body 222. Each of the cliff sensors is an optical sensor that can detect the presence or the absence of an object below the optical sensor, such as the mowable area 10. The cliff sensors can detect obstacles such as drop-offs and cliffs below portions of the robotic lawnmower 200 where the cliff sensors are disposed and redirect the robot accordingly. The cliff sensors can also be used to detect sloping terrain or other uneven terrain that can be difficult for the robotic lawnmower 200 to traverse, or can be used to detect that the robotic lawnmower 200 is tilted relative to the horizontal.

The sensor system can include one or more proximity sensors that can detect objects on the mowable area 10 that are near the robotic lawnmower 200. For example, the sensor system can include proximity sensors disposed proximate the forward portion 230 of the body 222. Each of the proximity sensors includes an optical sensor facing outward from the forward portion 230 of the body 222 and that can detect the presence or the absence of an object in front of the optical sensor. For example, the detectable objects include obstacles such as lawn fixtures, persons, and other objects in the environment of the robotic lawnmower 200.

The sensor system includes a bumper system including a bumper 242 and one or more bump sensors that detect contact between the bumper 242 and obstacles in the environment. The bumper 242 can form part of the body 222. For example, the bumper 242 can wrap around the forward portion 230 of the robotic lawnmower 200 and the lateral sides of the robotic lawnmower 200. The one or more bump sensors can include break beam sensors, capacitive sensors, or other sensors that can detect contact between the robotic lawnmower 200, e.g., the bumper 242, and objects in the environment. In some implementations, the one or more bump sensors can be used to detect movement of the bumper 242 along the longitudinal axis YR (shown in FIG. 3A) of the robotic lawnmower 200, and the one or more bump sensors can be used to detect movement of the bumper 242 along a lateral axis XR (shown in FIG. 3A) of the robotic lawnmower 200. The proximity sensors can detect objects before the robotic lawnmower 200 contacts the objects, and the bump sensors can detect objects that contact the bumper 242, e.g., in response to the robotic lawnmower 200 contacting the objects.

The sensor system includes one or more obstacle following sensors. For example, the robotic lawnmower 200 can include an obstacle following sensor along a lateral side of the robotic lawnmower 200. The obstacle following sensor can include an optical sensor facing outward from the lateral side of the body 222 that can detect the presence or the absence of an object adjacent to the lateral side of the body 222. For example, the detectable objects include obstacles such as lawn fixtures, persons, and other objects in the environment of the robotic lawnmower 200.

In some implementations, at least some of the proximity sensors, and the obstacle following sensor each include an optical emitter and an optical detector. The optical emitter emits an optical beam outward from the robotic lawnmower 200, e.g., outward in a horizontal direction, and the optical detector detects a reflection of the optical beam that reflects off an object near the robotic lawnmower 200. The robotic lawnmower 200, e.g., using the controller 228, can determine a time of flight of the optical beam and thereby determine a distance between the optical detector and the object, and hence a distance between the robotic lawnmower 200 and the object.

When the controller 228 causes the robotic lawnmower 200 to perform an operation involving movement about the mowable area 10, the controller 228 operates motors to drive the drive wheels 224, 226 and propel the robotic lawnmower 200 along the mowable area 10. In addition, the controller 228 operates motors to cause the cutting assemblies 216, 218 to rotate. To cause the robotic lawnmower 200 to perform various navigational and mowing behaviors, the controller 228 executes software stored on the memory storage element 240 to cause the robotic lawnmower 200 to perform by operating the various motors of the robotic lawnmower 200.

The sensor system can further include sensors for tracking a distance traveled by the robotic lawnmower 200. For example, the sensor system can include encoders associated with the motors for the drive wheels 224, 226, and these encoders can track a distance that the robotic lawnmower 200 has traveled.

The controller 228 uses data collected by the sensors of the sensor system to control navigational behaviors of the robotic lawnmower 200 during a mowing operation. For example, the controller 228 uses the sensor data collected by obstacle detection sensors of the robotic lawnmower 200, e.g., the cliff sensors, the proximity sensors, and the bump sensors, to enable the robotic lawnmower 200 to avoid obstacles within the environment of the robotic lawnmower 200 during the mission.

The sensor data can be used by the controller 228 for simultaneous localization and mapping (SLAM) techniques in which the controller 228 extracts features of the environment represented by the sensor data and constructs a map of the mowable area 10 of the environment. As the controller 228 directs the robotic lawnmower 200 about the mowable area 10 during the mission, the controller 228 uses SLAM techniques to determine a location of the robotic lawnmower 200 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open portions of the mowable area 10 are indicated on the map as traversable space.

The sensor data collected by any of the sensors can be stored in the memory storage element 240. In addition, other data generated for the SLAM techniques, including mapping data forming the map, can be stored in the memory storage element 240. These data produced during an operation can include persistent data that are produced during the operation and that are usable during a further operation. The persistent data, including the persistent map, enable the robotic lawnmower 200 to efficiently mow grass on the mowable area 10. For example, the persistent map enables the controller 228 to direct the robotic lawnmower 200 toward open portions of the mowable area 10 and to avoid nontraversable space. In addition, for subsequent missions, the controller 228 is able to plan navigation of the robotic lawnmower 200 through the environment using the persistent map to optimize paths taken during the missions.

The robotic lawnmower 200 can further include a communication system enabling wireless communication with a remote computing system. For example, the communication system can include a wireless transceiver. The wireless transceiver allows the robotic lawnmower 200 to wirelessly communicate data with a communication network (e.g., the communication network 301 described herein with respect to FIG. 6). The robotic lawnmower 200 can receive or transmit data using the wireless transceiver, and can, for example, receive data representative of a map and transmit data representative of mapping data collected by the robotic lawnmower 200.

Example Docking Stations

Figure 4:
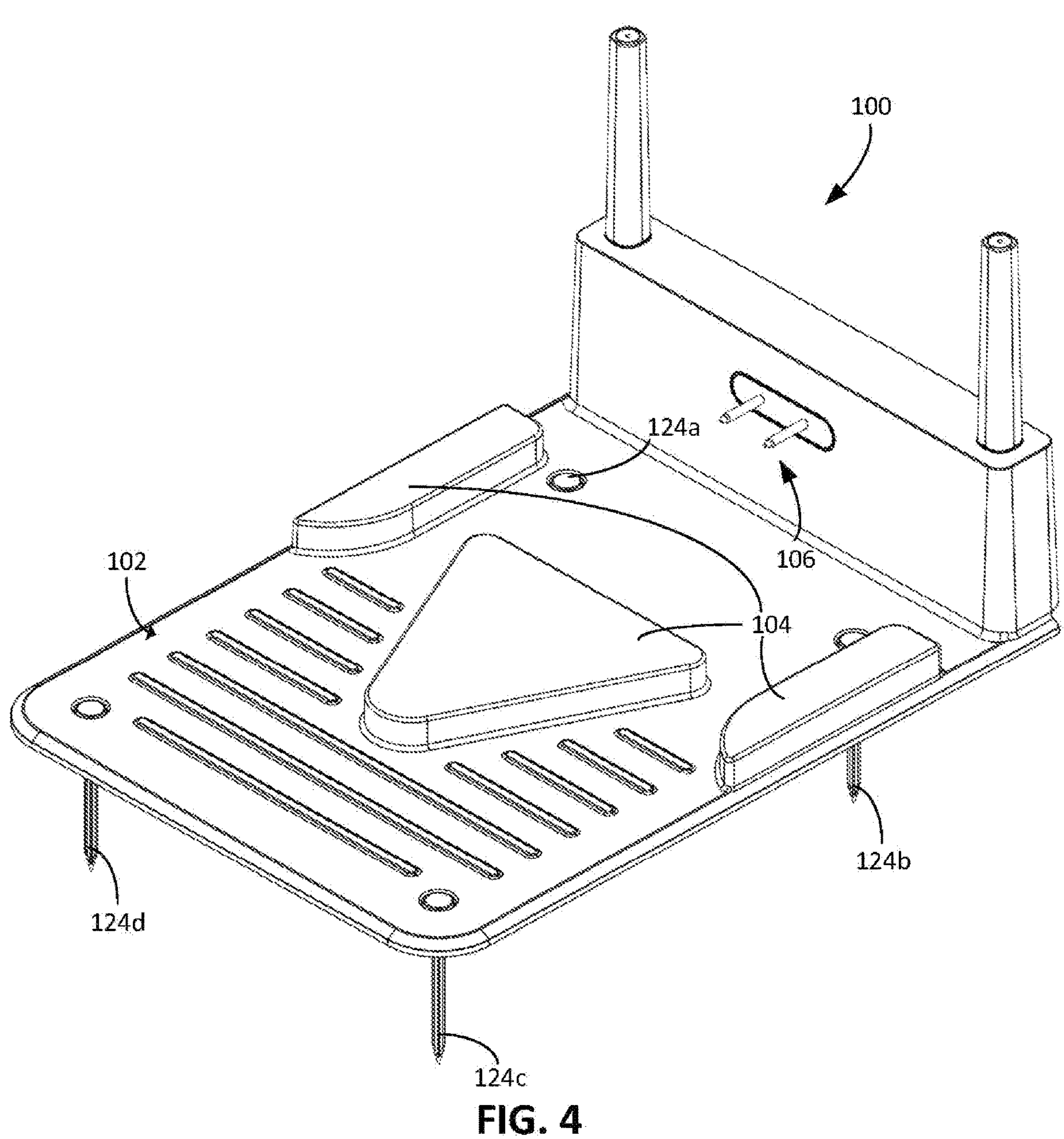
FIG. 4 is a perspective view of a docking station for an autonomous robotic lawnmower.

FIG. 4 illustrates an example of the docking station 100. The docking station 100 includes an electrical connector 106 (shown in FIG. 4A) configured to interface with the electrical connector 206 (shown in FIG. 3B) of the robotic lawnmower 200 so that the docking station 100 can charge a battery of the robotic lawnmower 200. The electrical connector 106 can be positioned above a base 102.

The docking station 100 can include support members 124*a*-124*d* (collectively referred to as support members 124) extending downwardly from the base 102. The support members 124 are elongate members insertable into a ground of the mowable area 10. The support members 124 can be, for example, stakes that can be driven into the ground of the mowable area 10, thereby supporting the docking station 100 on the mowable area 10 and preventing the docking station 100 from moving relative to the mowable area 10.

The guide mechanism 104 of the docking station 100 guides movement of the right and left wheel assemblies 202, 204 (shown in FIG. 3A) of the robotic lawnmower 200 and thereby also guides movement of the robotic lawnmower 200. This guidance can align the electrical connector of the robotic lawnmower 200 with the electrical connector 106 of the docking station 100.

The docking station 100 can include one or more beacons. In the example depicted in FIG. 2, the docking station 100 includes beacons 112 configured to emit signals detectable by the robotic lawnmower 200, e.g., using the sensor system. The signals emitted by the beacons 112 can be wireless signals similar to those described with respect to the beacons 20. The robotic lawnmower 200 detects the signals emitted by the beacons 112 to navigate the robotic lawnmower 200 toward the docking station 100 during a docking operation. In some implementations, the signals emitted by the beacons 112 are usable by the robotic lawnmower 200 to determine its location relative to the mowable area 10 during the mowable operation and to identify the boundary 30 of the mowable area 10 during the training operation. In other implementations, the robotic lawnmower 200 only uses the signals emitted by the beacons 20 for determining its location relative to the mowable area 10 during the mowable operation and to identify the boundary 30 of the mowable area 10 during the training operation.

Figure 5:
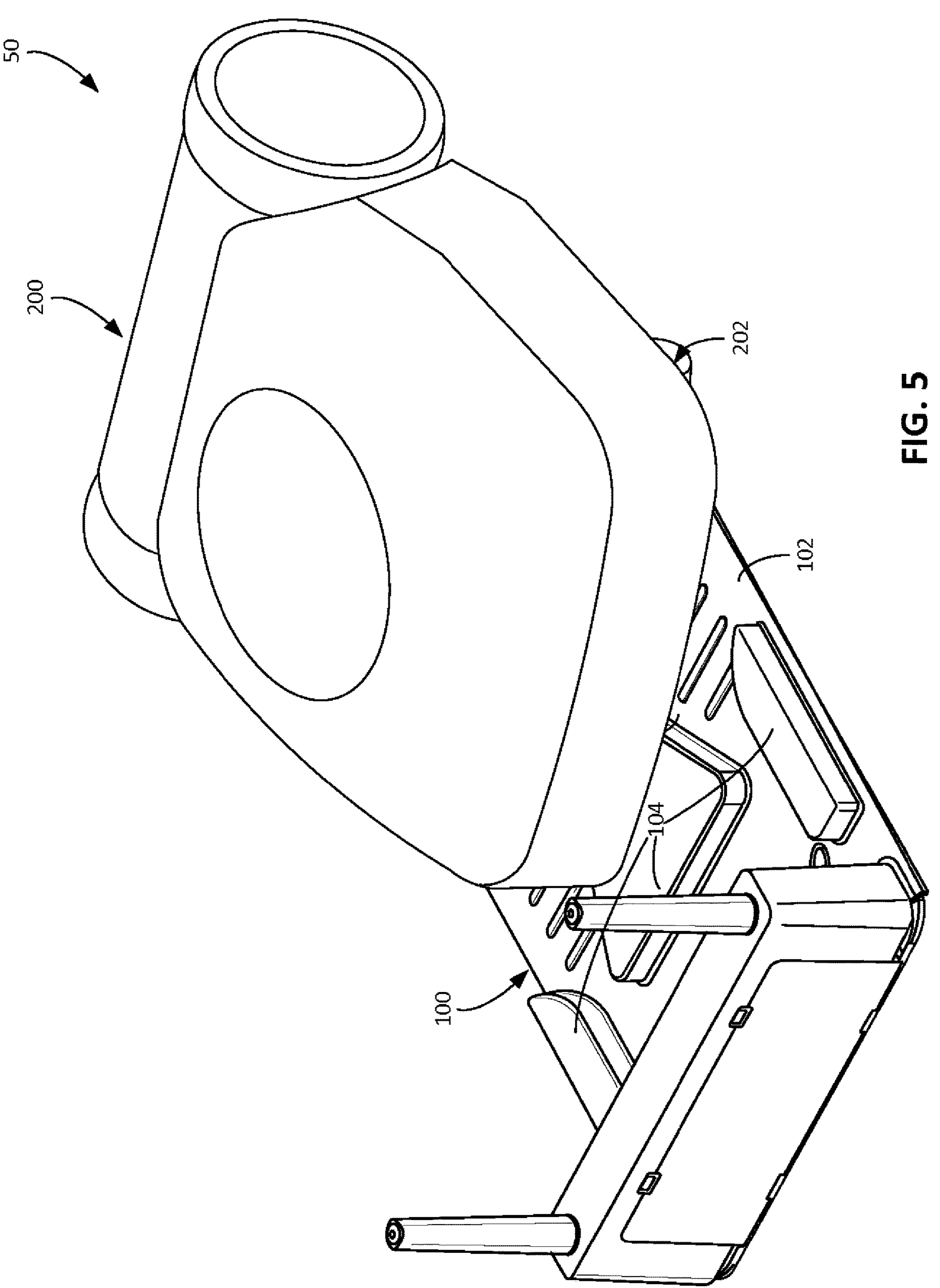
FIG. 5 illustrates an autonomous robotic lawnmower in the process of docking with a docking station.

Referring to the example shown in FIG. 5, the robotic lawnmower system 50 is illustrated during a docking operation. The robotic lawnmower 200 navigates toward the docking station 100 to dock with the docking station 100. When the robotic lawnmower 200 is docked with the docking station 100, the robotic lawnmower 200 is electrically connected to the docking station 100 such that the docking station 100 can recharge the battery of the robotic lawnmower 200. The robotic lawnmower 200 moves in a forward drive direction F (shown in FIG. 3A) toward the docking station 100. To dock with the docking station 100, the wheel assemblies 202, 204 of the robotic lawnmower 200 are guided along paths along a base 102 of the docking station 100. In certain examples, the electrical connector of a robotic lawnmower can be misaligned with an electrical connector of a docking station as the robotic lawnmower approaches the docking station. The guide mechanism 104 guides movement of the robotic lawnmower 200 along the base 102 of the docking station 100 such that the electrical connector 106 of the docking station 100 is aligned with the electrical connector of the robotic lawnmower 200 while the docking station 100 receives the robotic lawnmower 200. The robotic lawnmower 200 docks at the docking station 100 to receive electrical energy that can be used to perform an autonomous mowing operation on a mowable area. As described herein with respect to the process 800, the path along which the robotic lawnmower 200 moves during the docking operation can be taught so that the robotic lawnmower 200 approaches the docking station 100 at an angle that allows the guide mechanism 104 to guide the robotic lawnmower 200 into a proper docking position.

Example Communication Systems

Figure 6:
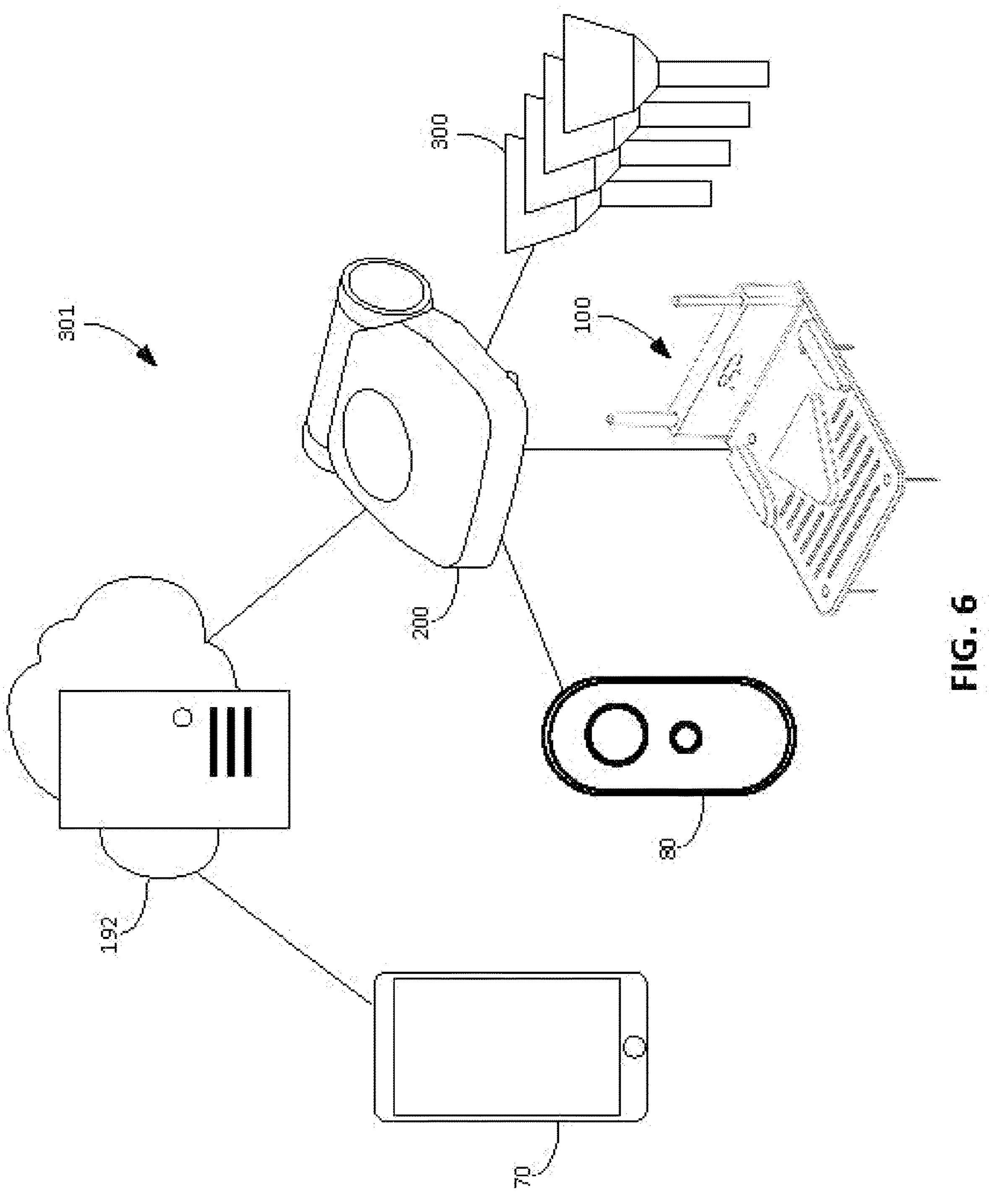
FIG. 6 is a diagram of a communication network.

Referring to FIG. 6, an example communication network 301 is shown. Nodes of the communication network 301 include the robotic lawnmower 200, the user device 70, the user device 80, a remote computing system 192, the beacons 300, and the docking station 100. Using the communication network 301, the robotic lawnmower 200, the user device 70, the user device 80, the remote computing system 192, the beacons 300, and the docking station 100 can communicate with one another to transmit data to one another and receive data from one another. As depicted in FIG. 6, the robotic lawnmower 200 can communicate directly with the remote computing system 192, the docking station 100, the user device 80, and the beacons 300, and the user device 70 can communicate directly with the remote computing system 192. The robotic lawnmower 200 can communicate with other devices through various wireless communication techniques, using radiofrequency, Bluetooth, infrared, optical, or other wireless communication techniques. The robotic lawnmower can communicate indirectly with the user device 70 through the remote computing system 192. Alternatively or additionally, the robotic lawnmower 200 can communicate directly with the user device 70. Various types and combinations of wireless networks (e.g., Bluetooth, radio frequency, optical based, etc.) and network architectures (e.g., mesh networks) may be employed by the communication network 301.

In some implementations, the user devices 70, 80 as shown in FIG. 6 are remote devices. The user devices 70, 80 can be operated by the user 60 (shown in FIG. 1) to provide inputs to control the robotic lawnmower 200. The user device 70, 80 can also receive information pertaining to the robotic lawnmower 200 and present information to the user (shown in FIG. 1) so that the user (shown in FIG. 1) can monitor the robotic lawnmower 200. In the example shown in FIG. 6, the user device 70 is a smartphone, with a touchscreen display that presents information for the user 60 and that enables the user 60 to provide inputs for controlling the robotic lawnmower 200. The user device 80 is a remote control, with a joystick enabling the user 60 to provide inputs for controlling the robotic lawnmower 200.

In other implementations, the user devices 70, 80 can include other user input elements such as, for example, one or more of a touchscreen display, buttons, a microphone, a mouse, a keyboard, or other devices that respond to inputs provided by the user 60. The user devices 70, 80 alternatively or additionally can include immersive media (e.g., virtual reality) with which the user 60 interacts to provide a user input. The user devices 70, 80 can be, for example, a virtual reality headset or a head-mounted display. The user 60 can provide inputs corresponding to commands for the robotic lawnmower 200. In such cases, the user devices 70, 80 transmit signals to the remote computing system 192 to cause the remote computing system 192 to transmit command signals to the robotic lawnmower 200. In some implementations, the user devices 70, 80 can present augmented reality images. In some implementations, the user devices 70, 80 can be a smartphone, a laptop computer, a tablet computing device, or other mobile device.

In the communication network 301 depicted in FIG. 5 and in other implementations of the communication network 301, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. The wireless links may use radiofrequency signals (e.g., ultra-wideband signals, wideband signals, WiFi signals, or other radiofrequency signals), magnetic signals, or other appropriate wirelessly transmitted signals. The wireless links may alternatively use optical signals, e.g., infrared signals.

Example Processes

Example processes are described below. These processes are described with respect to an application loaded on the user device 70. The application can be an application for operating autonomous mobile robots, e.g., robotic lawnmowers, autonomous cleaning robots, autonomous vacuum robots, patrol robots, and the like, in the household or environment of the user 60.

The example methods described with respect to FIGS. 7-19 are described with respect to the robotic lawnmower 200, the docking station 100, a computing system 350, the user device 70, and/or the user 60 can be controlled in certain manners in accordance with processes described herein. The computing system 350 can be a controller located on the robotic lawnmower 200, the user device 70, or the remote computing system 192. Furthermore, while the processes are described with respect to the robotic lawnmower 200, the docking station 100, the computing system 350, and the user device 70, these processes can be implemented by other types of robotic lawnmowers, docking stations, computing systems, and user devices. These processes are also described with respect to the beacons 300 and the mowable area 10 (shown in FIG. 2). But the number and type of beacons and mowable area can vary in other implementations.

While some operations of these processes may be described as being performed by the robotic lawnmower 200, the docking station 100, the computing system 350, the user 60, or by another actor, these operations may, in some implementations, be performed by actors other than those described. For example, an operation performed by the robotic lawnmower 200 can be, in some implementations, performed by the remote computing system 192 or by another computing device (or devices). In other examples, an operation performed by the user 60 can be performed by a computing device. In some implementations, the operations of the computing system 350 are performed entirely by the user device 70 and the robotic lawnmower 200. In some implementations, the robotic lawnmower 200 can perform, in addition to the operations described as being performed by the robotic lawnmower 200, the operations described as being performed by the computing system 350 or the user device 70. Other variations are possible. Furthermore, while the methods, processes, and operations described herein are described as including certain operations or sub-operations, in other implementations, one or more of these operation or sub-operations may be omitted, or additional operations or sub-operations may be added.

FIG. 7 illustrates a process 400 for providing recommended beacon locations. The process 400 includes operations 402, 404, 406, 408, 410, 412, 414, 416. In this process 400, the user 60 can operate the user device 70 to receive information on recommended locations to place the beacons 300.

At the operation 402, the robotic lawnmower 200 establishes wireless communication with the computing system 350. At the operation 404, the user device 70 establishes wireless communication with the computing system 350. In implementations where operations of the computing system 350 are performed by the robotic lawnmower 200, the robotic lawnmower 200 can establish wireless communication directly with the user device 70.

At the operation 406, the computing system 350 transmits data to the user device 70 to cause the user device 70 to present information specifying recommended beacon locations. As depicted in FIG. 7, the operation 406 can occur after the robotic lawnmower 200 and the user device 70 establish wireless communication with the computing system 350. In other implementations, the robotic lawnmower 200 does not need to establish wireless communication before the computing system 350 transmits data to the user device 70.

At the operation 408, the user device 70 presents instructions indicating considerations for placement of beacons on a mowable area. The user device 70 can present the instructions on the user interface of the user device 70. FIGS. 8A-8B illustrate examples in which the user device 70 presents instructions on its user interface 75 indicating certain considerations for the user 60 in placing the beacons 300 relative to the mowable area 10. For example, as shown in FIG. 8A, the user device 70 device present messages 420, 422, with the message 420 recommending the user 60 consider locations of obstacles in placing the beacons 300 relative to the mowable area 10, and with the message 422 recommending to the user 60 a minimum number of beacons that the robotic lawnmower 200 should detect to be able to navigate about the mowable area 10. As shown in FIG. 8A, the message 422 indicates that the minimum number of beacons that the robotic lawnmower 200 should detect is three. In other implementations, one, two, four, or more beacons corresponds to the minimum number of beacons that the robotic lawnmower 200 should detect to be able to navigate about the mowable area 10.

Other messages can be presented to guide the user 60 in placing the beacons 300 relative to the mowable area 10. As shown in FIG. 8B, the user device 70 can present messages 424, 426. The message 424 can indicate a recommended range of each of the beacons 300. The message 424 indicates that the recommended range for the beacons 300 is 25 meters. In other implementations, the recommended range is, for example, between 5 and 40 meters, e.g., between 5 and 20 meters, 10 and 30 meters, 15 and 35 meters, or 20 and 40 meters. In implementations in which the docking station 100 can receive one or more of the beacons 300, the message 426 in FIG. 8B can indicate a number of beacons that should be placed in the docking station 100. In the example depicted in FIG. 8B, the message 426 recommends to the user 60 to place two beacons within the docking station 100. In other implementations, the number of beacons to be placed in the docking station 100 can be one, three, four, or more beacons.

Referring back to FIG. 7, at the operations 410, 412, the user device 70 can present one or more representations of potential shapes of mowable areas, and indicators of recommended locations for the beacons 300. These representations of the potential shapes and the corresponding indicators of the recommended locations for the beacons can guide the user 60 to place the beacons 300 about the mowable area 10 in ways that allow the robotic lawnmower 200 to efficiently move about mowable area 10 while determining its location relative to the mowable area 10. In some implementations, the user device 70 can present a list of potential shapes of mowable area, and the user 60 can select one of the potential shapes. The user device 70 can then present the recommendation beacon locations for the selected potential shape.

At the operation 410, referring to FIG. 8B, the user device 70 presents a representation of a first potential shape 430 of a mowable area, and first indicators 432 of first recommended locations for the beacons 300. The first potential shape 430 can correspond to a substantially amoeba or rectangular shape. The first indicators 432 can be positioned along a perimeter of the representation of the first potential shape 430 of the mowable area, and/or can be overlaid on the representation of the first potential shape 430 of the mowable area. The user device 70 can further present an indicator of a recommended location and a recommended orientation of the docking station 100. For example, the user device 70 can present an indicator 434 indicative of a location of the docking station 100. In some implementations, the indicator 434 can appear as a representation of the robotic lawnmower 200. The user device 70 can also present indicator 436, 438 indicating locations of the beacons 112 on the docking station 100. The indicator 434, 436, 438 together can indicate the recommended location and recommended orientation of the docking station 100. The quantity of indicators representing the recommended locations of the beacons 300, e.g., the quantity of the first indicators 432 and the indicators 436, 438, can be based on the first potential shape, size, or other geometric feature of the potential geometry of the lawn being represented on the user interface 75 of the user device 70.

At the operation 412, referring to FIG. 8C, the user device 70 presents a representation of a second potential shape 440 of a mowable area, and second indicators 442 of second recommended locations for the beacons 300. The second potential shape 440 can correspond to an L-shaped mowable area. For example, the second potential shape 440 can include a first substantially rectangular portion 440_a_ and a second substantially rectangular portion 440_b_. The second indicators 442 can be positioned along a perimeter of the representation of the second potential shape 440 of the mowable area, and/or can be overlaid on the representation of the second potential shape 440 of the mowable area. The user device 70 can present indicators 441 of potential locations of obstacles located relative to the mowable area and the indicators 442 of the second recommended locations for the beacons 300. The user device 70 can further present an indicator of a recommended location and a recommended orientation of the docking station 100. For example, the user device 70 can present an indicator 444 indicative of a location of the docking station 100. In some implementations, the indicator 444 can appear as a representation of the robotic lawnmower 200. The user device 70 can also present indicator 446, 448 indicating locations of the beacons 112 on the docking station 100. The indicator 444, 446, 448 together can indicate the recommended location and recommended orientation of the docking station 100. The quantity of indicators representing the recommended locations of the beacons 300, e.g., the quantity of the second indicators 442 and the indicators 446, 448, can be based on the second potential shape, size, or other geometric feature of the potential geometry of the lawn being represented on the user interface 75 of the user device 70.

FIG. 7 illustrates an example in which representations of two potential shapes of the mowable area 10 can be shown. Further representations, e.g., more than two representations, can be shown to guide the user 60 in some implementations. For example, as shown in FIG. 8D, the user device 70 can present a representation of a third potential shape 450 of a mowable area, and indicators 452, 454, 456, 458. The indicators 452, 454, 456, 458 are similar to the indicators 452, 454, 456, 458, respectively, described with respect to FIG. 8C. The representation of the third potential shape 450 of the mowable area differs from the representation of the second potential shape 440 of the mowable area in that the third potential shape is a substantially U-shaped area with a first, second, and third substantially rectangular portions 440*a*, 440*b*, 440*c*.

As illustrated in the examples shown in FIGS. 8B-8D, the recommended quantity of beacons can vary depending on the geometry of the potential shape of the mowable area. For example, as the size and complexity of the geometry of the potential shape of the mowable area increases, the recommended quantity of beacons can increase as well. In the examples shown in FIGS. 8B-8D, the quantity of beacons recommended for the first, second, and third potential shapes 430, 440, 450 are five, seven, and eight, respectively. In some implementations, the user device 70 can present the different potential shapes in increasing order of quantity of beacons recommended, or in increasing order of complexity and size. Other potential shapes for which representations are presented on the user device 70 can include shapes with four or more substantially rectangular portions, circular shapes, amorphous shapes, or other potential shapes for mowable areas.

After the user device 70 presents instructions and recommendations at the operations 408, 410, 412, as shown in FIG. 7, at the operation 414, the user 60 places the beacons 300 on the mowable area 10. The user 60 can place the beacons 300 based on the instructions and recommendations provided by the user device 70. At the operation 416, the user 60 can confirm that the user 60 has placed the beacons 300 on the mowable area 10. With the beacons 300 placed on the mowable area 10, if applicable, the user 60 can perform other operations for setting up the robotic lawnmower 200 for performing a mowing operation, such as a teach operation, a training operation, or a test operation. Alternatively, the user 60 can initiate the mowing operation of the robotic lawnmower 200.

Figure 9:
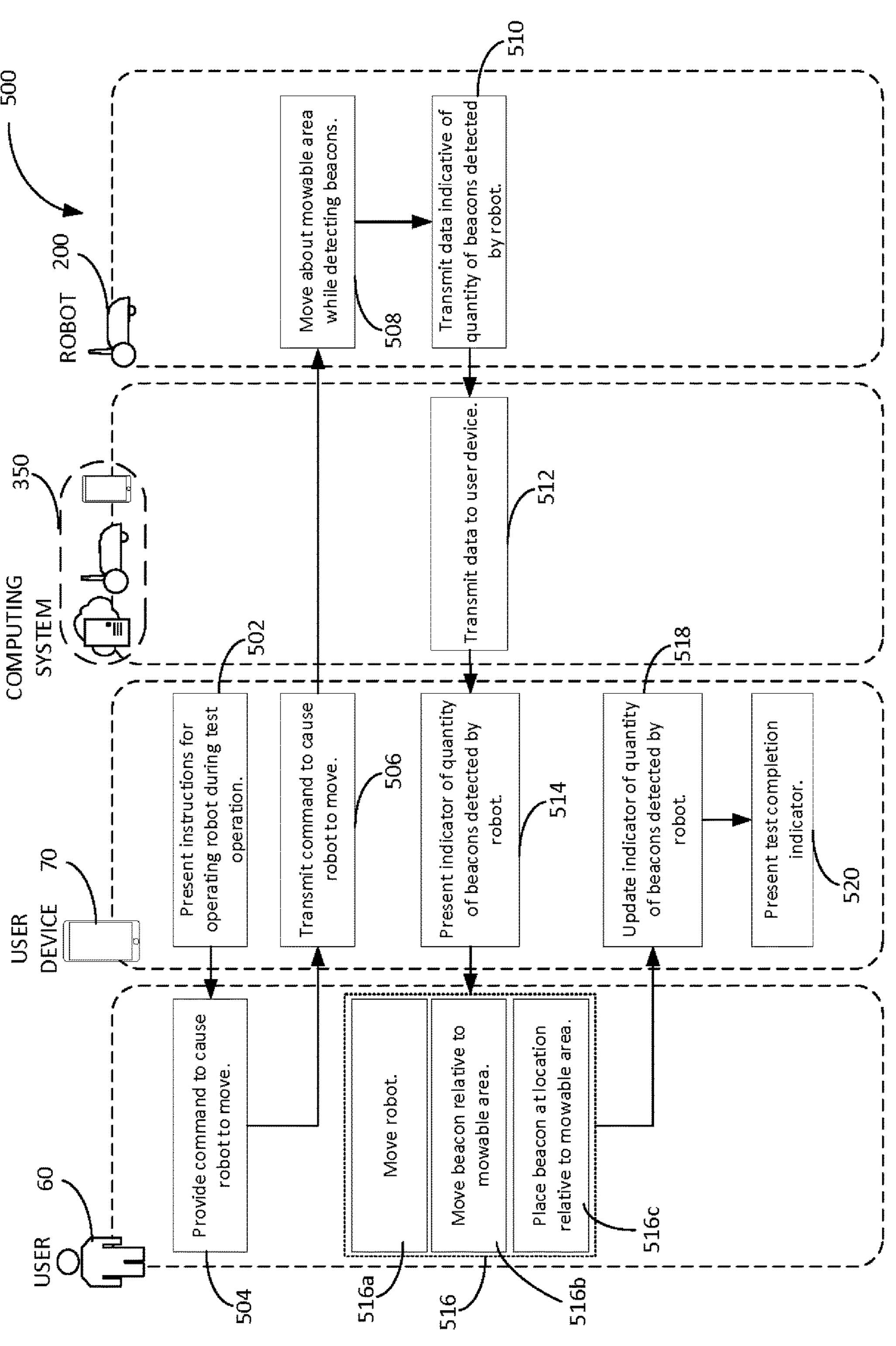
FIG. 9 is a flowchart of a process of providing an indicator of a quantity of beacons detected by an autonomous robotic lawnmower.

FIG. 9 illustrates a process 500 of providing an indicator of a quantity of beacons detected by an autonomous robotic lawnmower. The process 500 includes operations 502, 504, 506, 508, 510, 512, 514, 516, 518, 520. In this process 500, the user device 70 can present an indicator of the beacons 300 that the robotic lawnmower 200 detects at a location. The location can correspond to a current or previous location of the robotic lawnmower 200. This process 500 can be facilitated using the application described with respect to the process 400. In some implementations, the process 500 can be part of a test operation in which the autonomous robotic lawnmower system 50 is tested to determine whether the robotic lawnmower 200, the beacons 300, and the docking station 100 are properly set up for a mowing operation of the robotic lawnmower 200. The test operation can occur before the mowing operation to ensure that the robotic lawnmower 200 can move along the mowable area 10 while still being able to determine its location relative to the mowable area 10.

Figure 10A:
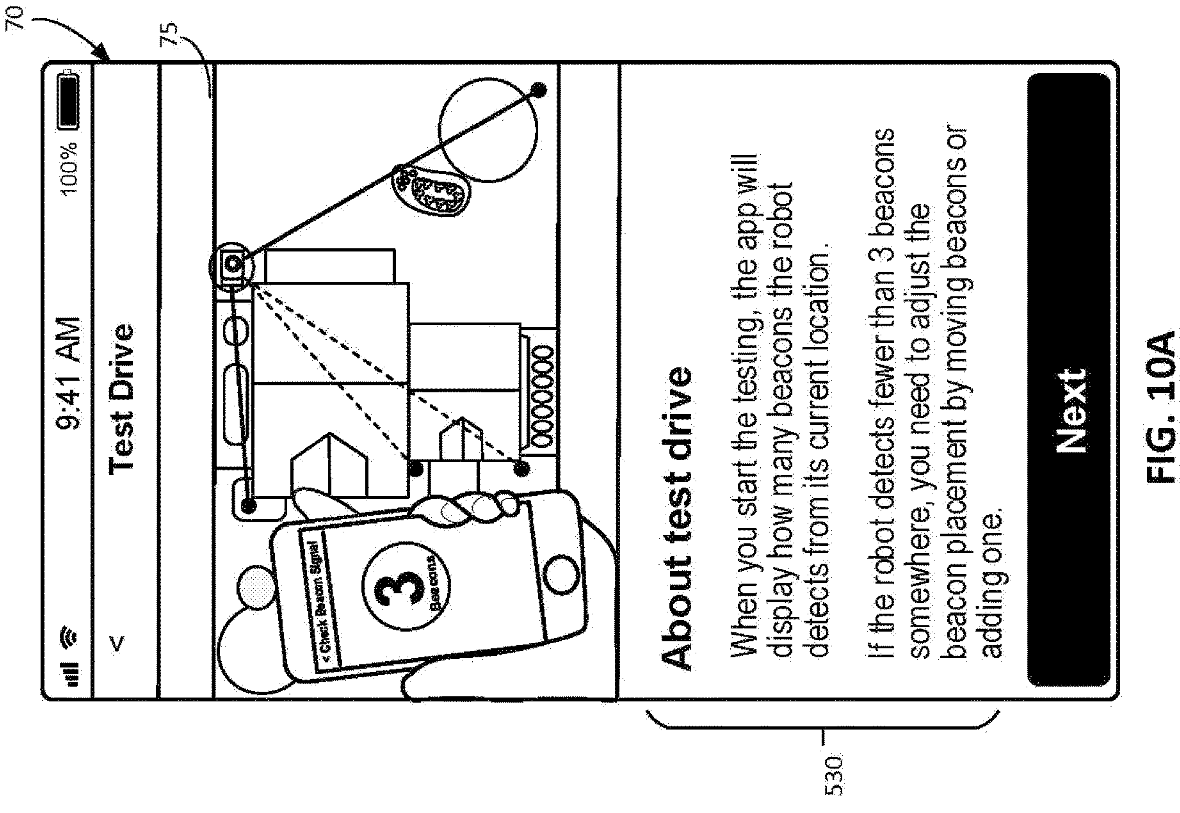
FIGS. 10A-10C are illustrations of a user interface during a process of providing an indicator of a quantity of beacons detected by an autonomous robotic lawnmower.

The process 500 can begin with one or more operations to initiate the test operation of the robot lawnmower 200. Referring also to FIG. 10A, at the operation 502, the user device 70 presents instructions 530 (shown in FIG. 10A) for operating the robotic lawnmower 200 during a test operation. The user device 70 can present the instructions 530 on the user interface 75 in response to a confirmation from the user 60 that the user 60 has placed the beacons 300 relative to the mowable area 10. In some implementations, the user 60 can provide a user input to the user device 70 to initiate the test operation. After initiating the test operation, the user device 70 can provide the instructions 530.

The instructions 530 can include instructions for a sequence of movements of the robotic lawnmower 200 to be performed during the test operation. For example, the instructions 530 can, in some implementations, include a user instruction to move the robotic lawnmower 200 along a perimeter of the mowable area 10. The instructions 530 can further include a user instruction to move the robotic lawnmower 200 through a central region of the mowable area 10. The order in which the robotic lawnmower 200 is moved along the perimeter and is moved through the central region of the mowable area 10 can vary implementations. In some implementations, the test operation can include or be part of a boundary training operation in which the robotic lawnmower 200 is moved along the boundary 30 of the mowable area 10 to teach the boundary 30 to the robotic lawnmower 200.

At the operations 504, 506, 508, the robotic lawnmower 200 is controlled to navigate about the mowable area 10 during the test operation. In the process 500 illustrated FIG. 9, at the operation 504, the user 60 can provide a command to cause the robotic lawnmower 200 to move. At the operation 506, the user device 70 transmits the command to cause the robotic lawnmower 200 to move, e.g., in response to the command provided at the operation 504. And, at the operation 508, the robotic lawnmower 200 moves about the mowable area 10, e.g., in response to the command transmitted by the user device 70 at the operation 506.

In some implementations, the command provided by the user 60 corresponds to a command that causes the robotic lawnmower 200 to move in a certain direction. For example, the user input device of the user device 70 can be operated to cause the robotic lawnmower 200 to move left, right, forward, or backward. In some implementations, the operation 504 can involve the user 60 providing the command to the user device 70 while in other implementations, the operation 504 can involve the user 60 providing the command to another user device distinct from the user device 70, such as a remote control. In some implementations, rather than providing the command to the user device 70, the user 60 can manually move the robotic lawnmower 200 in accordance with the instructions 530 provided by the user device 70. For example, the robotic lawnmower 200 can include a push bar manually operable by the user 60 to allow the user 60 to push the robotic lawnmower 200 about the mowable area 10.

At the operations 510, 512, data indicative of a quantity of the beacons 300 detected by the robotic lawnmower 200 are transmitted to the user device 70 to allow the user device 70 to present an indicator of the quantity of the beacons 300 detected by the robotic lawnmower 200. At the operation 510, the robotic lawnmower 200 transmits the data indicative of the quantity of beacons 300 detected by the robotic lawnmower 200, e.g., transmits the data to the computing system 350. At the operation 512, after receiving the data transmitted by the robotic lawnmower 200, the computer system 350 transmits data to the user device 70. The data transmitted to the user device 70 at the operation 512 can correspond to the data transmitted by the robotic lawnmower 200 at the operation 510. The robotic lawnmower 200, as part of the operation 510, can detect the beacons 300 using the systems and methods described herein. For example, the detection system 220 (shown in FIG. 3B) can be used to determine the quantity of the beacons 300 detected by the robotic lawnmower 200.

At the operations 514, 516, 518, 520, the user device 70 provides one or more indicators of the quantity of the beacons 300 detected by the robotic lawnmower. The user device 70 can also indicate a status of the robotic lawnmower 200, and a progress of the test operation. As the quantity of beacons detected by the robotic lawnmower 200 changes, e.g., during movement of the robotic lawnmower 200 or because of a change in the quantity of beacons placed relative to the mowable area 10 or because of a change in a location of one of the beacons 300, the one or more indicators of the quantity of beacons detected by the robotic lawnmower 200 can be updated. In the process presented in FIG. 9, at the operation 514, the user device 70 presents an indicator of the quantity of the beacons 300 detected by the robotic lawnmower 200. The indicator can vary depending on the quantity of beacons detected by the robotic lawnmower 200. For example, the user device 70 can present an indicator 532 (shown in FIG. 10B) if the quantity of the beacons detected by the robotic lawnmower 200 is at or above a threshold quantity, and can present an indicator 534 (shown in FIG. 10C) if the quantity of beacons detected by the robotic lawnmower 200 is below the threshold quantity. The threshold quantity represents a quantity of beacons that the robotic lawnmower 200 should detect during its mowing operations so that the robotic lawnmower 200 can accurately and precisely determine its location relative to the mowable area 10. The threshold quantity can be two, three, four, or more beacons.

At the operation 516, the user 60 adjusts the robotic lawnmower system 50 to change the number of beacons detected by the robotic lawnmower 200. For example, the user 60 can perform one or more of the operations 516*a*, 516*b*, 516*c*. If the user 60 performs the operation 516*a*, the user 60 can move the robotic lawnmower 200. If the user 60 performs the operations 516*b*, the user 60 can move one of the beacons 300 relative to the mowable area 10. If the user performs the operation 516*c*, the user 60 can place a new beacon at a location relative to the mowable area 10. At the operation 518, the user device 70 can update the indicator of the quantity of beacons detected by the robotic lawnmower 200. The indicated quantity of detected beacons can change in response to the operation 516 performed by the user 60. At the operation 520, the user device 70 presents a test completion indicator to indicate that the test operation is complete. This test completion indicator can be presented after the robotic lawnmower 200 has substantially traversed an entirety of the mowable area 10, e.g., 90% to 100% of the mowable area 10, at least 80%, 90%, 95%, or 99% of the total area of the mowable area 10. In some implementations, the test completion indicator is presented only if the robotic lawnmower 200 makes this traversal without the quantity of beacons detected by the robotic lawnmower 200 being less than the threshold quantity. In some implementations, the operations 514, 516, 518 can be repeated as the robotic lawnmower 200 is moved about the mowable area 10, e.g., until the conditions for presenting the test completion indicator are satisfied.

Figures 10B, 10C:
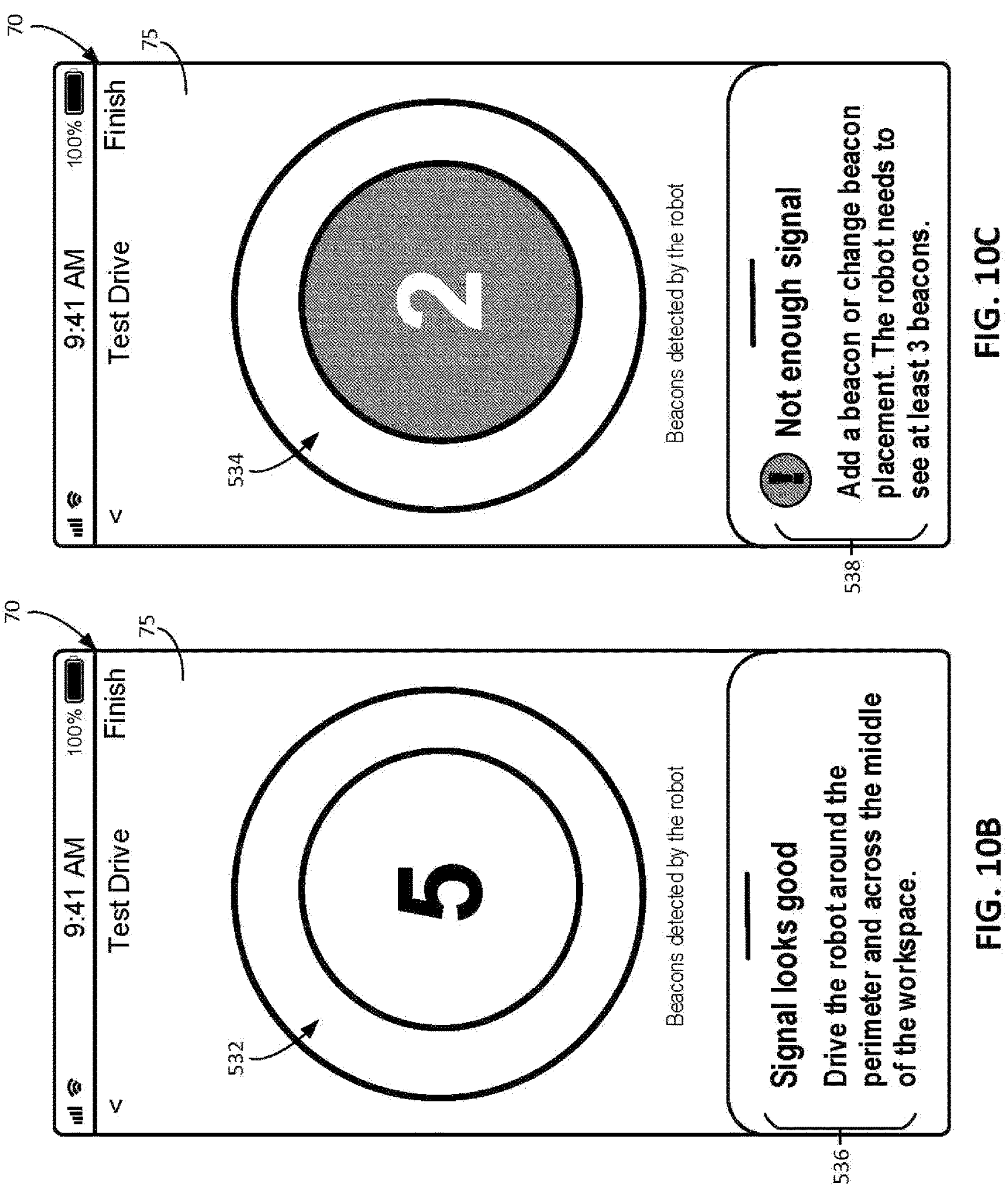
Figure 11A:
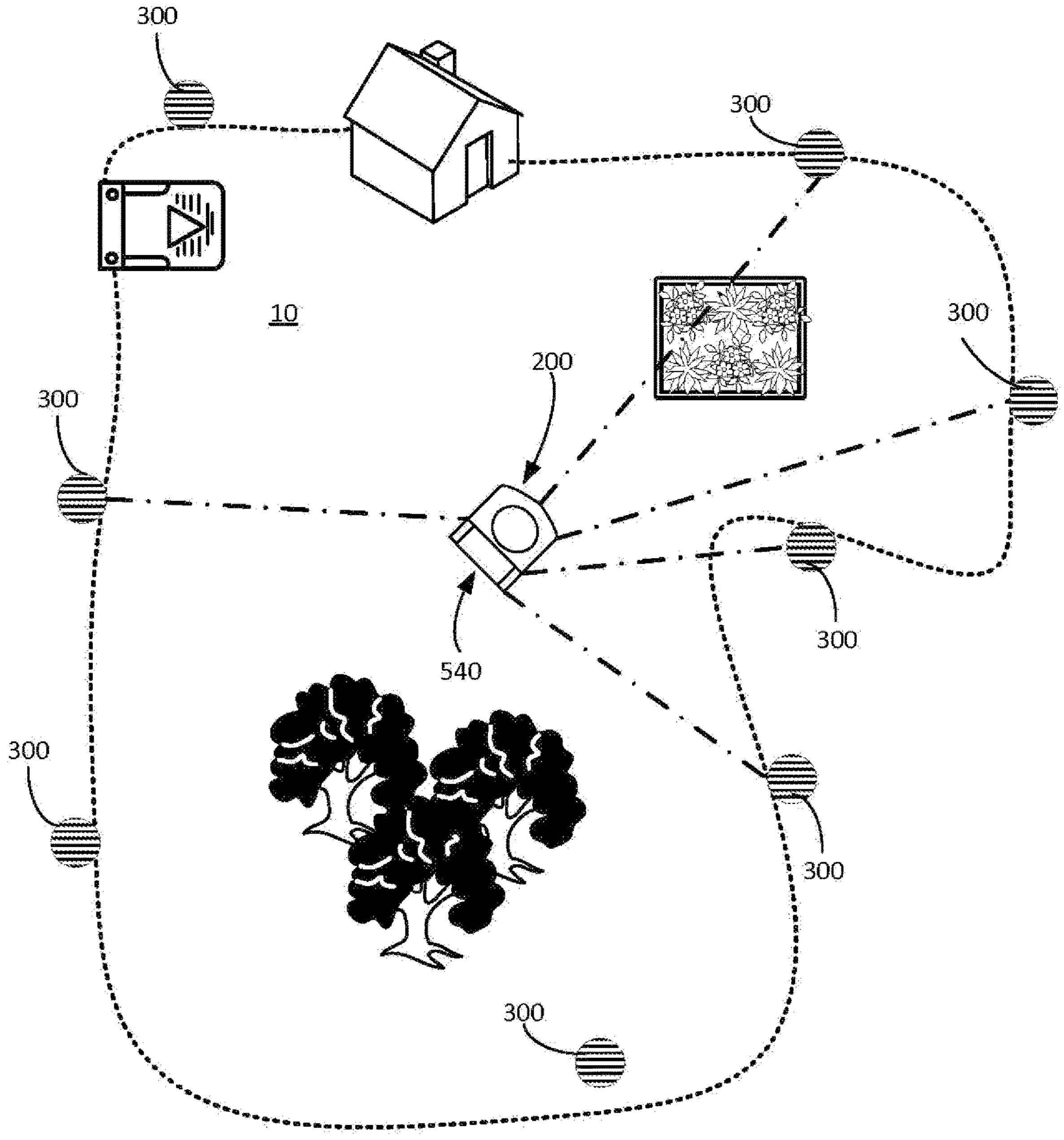
FIGS. 11A-11B are top views of an environment including an autonomous robotic lawnmower during a process of providing an indicator of a quantity of beacons detected by the autonomous robotic lawnmower.
Figure 11B:
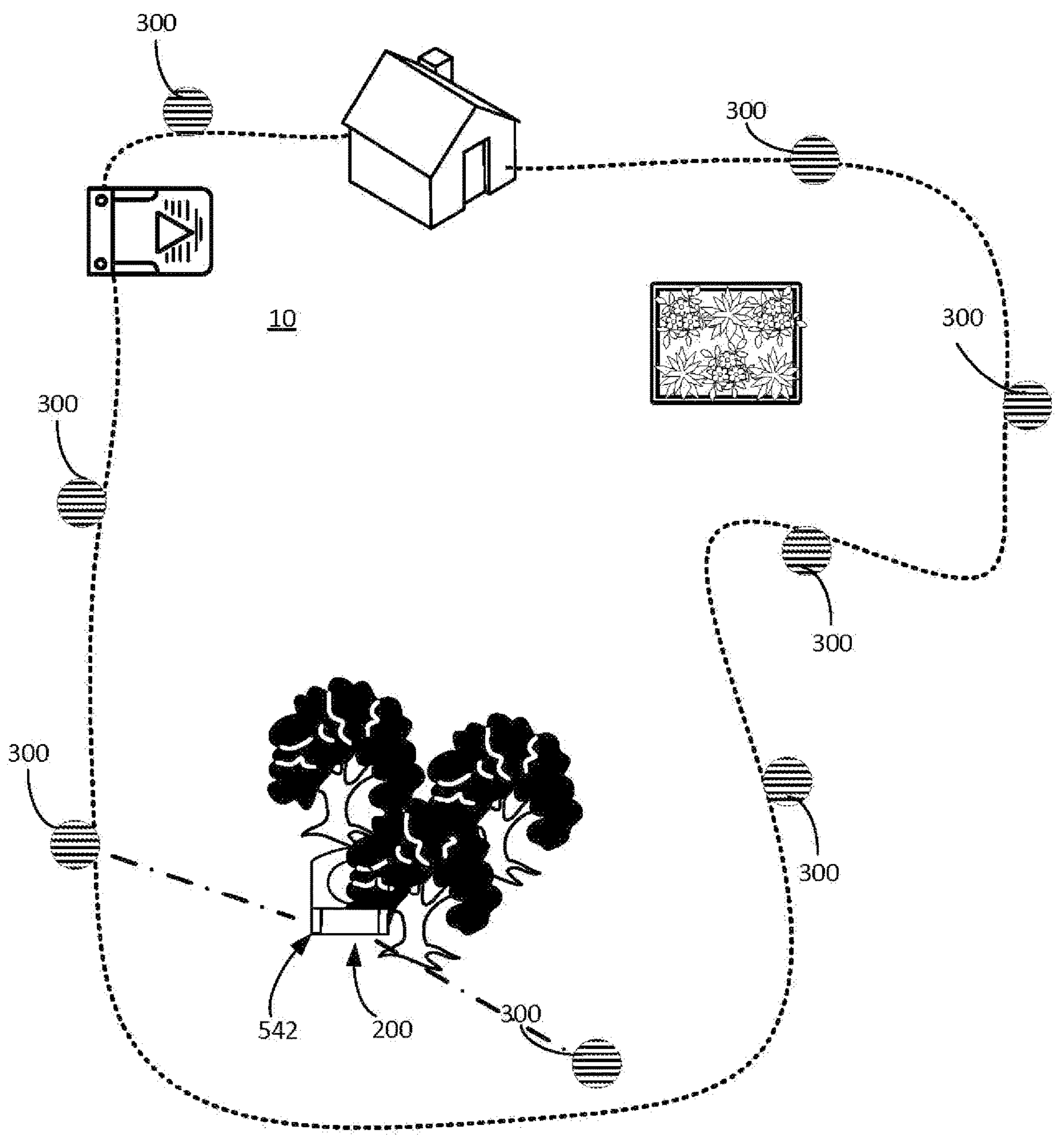
Figure 12:
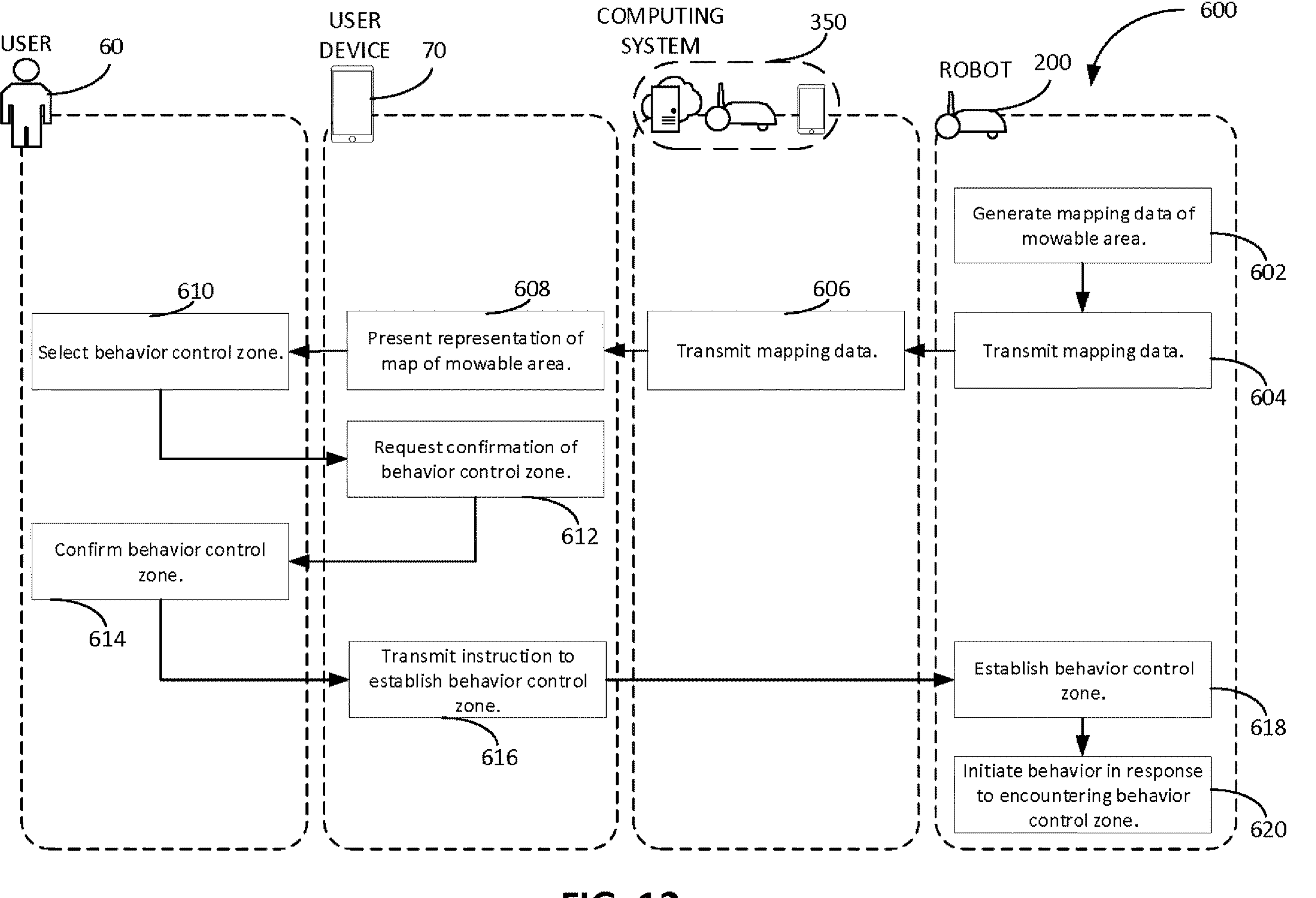
FIG. 12 is a flowchart of a process of establishing a behavior control zone for an autonomous robotic lawnmower.

FIGS. 10B and 10C illustrate example indicators 532, 534 of the quantity of the beacons detected by the robotic lawnmower 200 when the robotic lawnmower 200 is at the locations illustrated in FIGS. 11A and 11B. The indicators 532, 534 can be presented as part of the operations 514 and 518, as described herein. Referring to FIG. 10B, the indicator 532 provides a visual indication of the quantity of beacons detected by the robotic lawnmower 200 at a location 540 shown in FIG. 11A. The user interface 75 of the user device 70 can further present a message 536 indicating whether the robotic lawnmower 200 detects a sufficient number of the beacons 300. In the example depicted in FIG. 10B, the indicator 532 indicates that the robotic lawnmower 200 detects five beacons, and the message 536 indicates that the robotic lawnmower 200 detects a sufficient number of beacons, i.e., detects at least the threshold quantity of beacons. As shown in FIG. 11A, at the location 540, the robotic lawnmower 200 can detect at least five of the beacons 300.

Referring to FIG. 10C, the indicator 534 provides a visual indication of the quantity of beacons detected by the robotic lawnmower 200 at a location 542 shown in FIG. 11B. The indicator 534 indicates that only two beacons are detected by the robotic lawnmower, and a message 538 indicates that the robotic lawnmower 200 does not detect a sufficient number of beacons. The message 538 indicates that the robotic lawnmower 200 should detect a threshold quantity of beacons, i.e., should detect at least three beacons. As shown in FIG. 11B, at the location 542, the robotic lawnmower 200 can only detect two of the beacons 300.

In some implementations, as shown in FIGS. 10B and 10C, visual characteristics of the indicators 532, 534 can vary depending on whether a sufficient number of beacons are detected by the robotic lawnmower 200. For example, the indicator 532 is a first color indicating that a sufficient number of beacons are detected by the robotic lawnmower 200. In particular, the first color (e.g., a green color) indicates that the quantity of beacons detected by the robotic lawnmower 200 is no fewer than the threshold quantity. The indicator 534 is a second color (e.g., a red color) indicating that an insufficient number of beacons are detected by the robotic lawnmower 200. The second color indicates that the quantity of beacons detected by the robotic lawnmower 200 is fewer than the threshold quantity.

FIG. 12 illustrates a process 600 of establishing a behavior control zone for an autonomous robotic lawnmower. The process 600 includes operations 602, 604, 606, 608, 610, 612, 614, 616, 618, 620. In the process 600, the user device 70 can be operated by the user 60 to select a behavior control zone and then establish the behavior control zone to control a behavior of the robotic lawnmower 200. The user-selected behavior control zone, when encountered by the robotic lawnmower 200, can cause the robotic lawnmower 200 to initiate a behavior in response to encountering the user-selected behavior control zone as the robotic lawnmower 200 navigates about the mowable area 10 during a mowing operation.

The process 600 can begin with one or more operations to provide a representation of the mowable area 10 to the user 60. For example, at the operation 602, the robotic lawnmower 200 generates mapping data of the mowable area 10. The robotic lawnmower 200 can generate these mapping data as the robotic lawnmower 200 moves about the mowable area 10 during a teach operation, a mowing operation, or other operation of the robotic lawnmower 200. The mapping data can correspond to data collected by one or more sensors of the sensor system of the robotic lawnmower 200. Then, the mapping data, or data indicative of the mapping data, are provided to the user device 70 so that the user device 70 can provide the representation of the mowable area 10. For example, at the operation 604, the robotic lawnmower 200 transmits the mapping data to the computing system 350, and at the operation 606, the computing system 350 transmits the mapping data to the user device 70. Then, the user device 70, at the operation 608, presents on the user interface 75 a representation of a map of the mowable area 10.

The process 600 proceeds with a behavior control zone being selected. In the example shown in FIG. 12, the behavior control zone is a user-selected behavior control zone in which the user 60 selects, at the operation 610, the behavior control zone. In some implementations, the user 60 selects the behavior control zone by providing an input to the user device 70. The user 60 can operate a user input device of the user device 70, such as a touchscreen of the user device 70. In some implementations in which the user device 70 is a smartphone, the user 60 can operate a touchscreen of the smartphone to select a perimeter of the behavior control zone. The map of the mowable 10 presented on the user interface 70 can provide context for the user 60 in selecting a location on the mowable area 10 to establish the behavior control zone. In particular, the user-selected behavior control zone can correspond to a user selection of a portion of the representation of the map of the mowable area 10, and the user selection of the portion of the representation of the map of the mowable area 10 can be a user selection of a desired perimeter for the user-selected behavior control zone.

In some implementations, the user 60 selects the behavior control zone by teaching a path defining a desired perimeter for the behavior control zone. In particular, the robotic lawnmower 200 can be maneuvered along the desired perimeter for the behavior control zone. The user 60 can push the robotic lawnmower 200 along the desired perimeter, or can operate the user device 70 or some other user device to remotely control movement of the robotic lawnmower 200 along the desired perimeter.

In some implementations, the user 60 selects the behavior control zone by accepting a recommended behavior control zone. This recommended behavior control zone can be determined by the robotic lawnmower 200, the computing system 350, the user device 70, or some combination of these devices. Examples of processes for providing recommended behavior control zones are described herein.

Figure 13B:
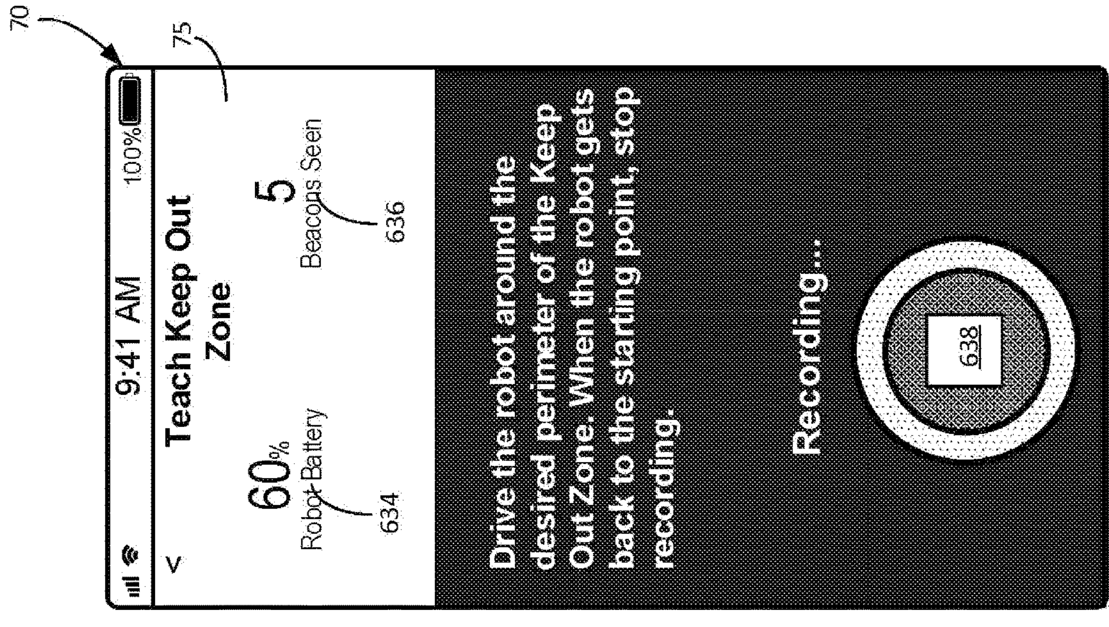
FIGS. 13A-13C are illustrations of a user interface during a process of establishing a behavior control zone for an autonomous robotic lawnmower.
Figure 13A:
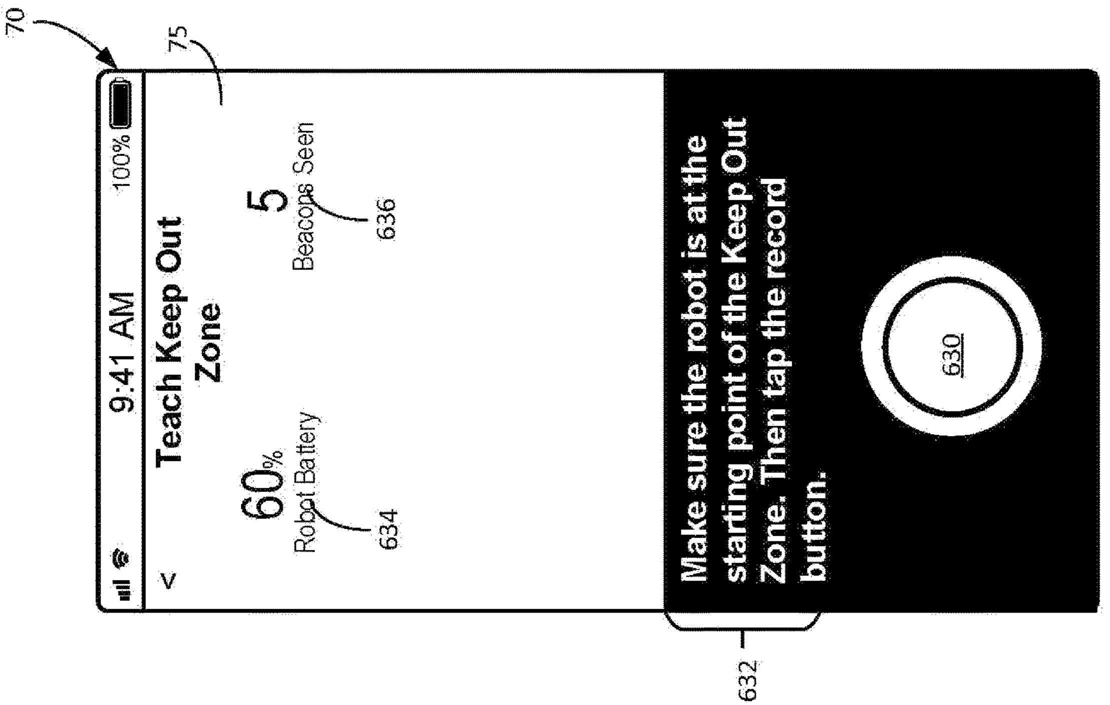
Figure 13C:
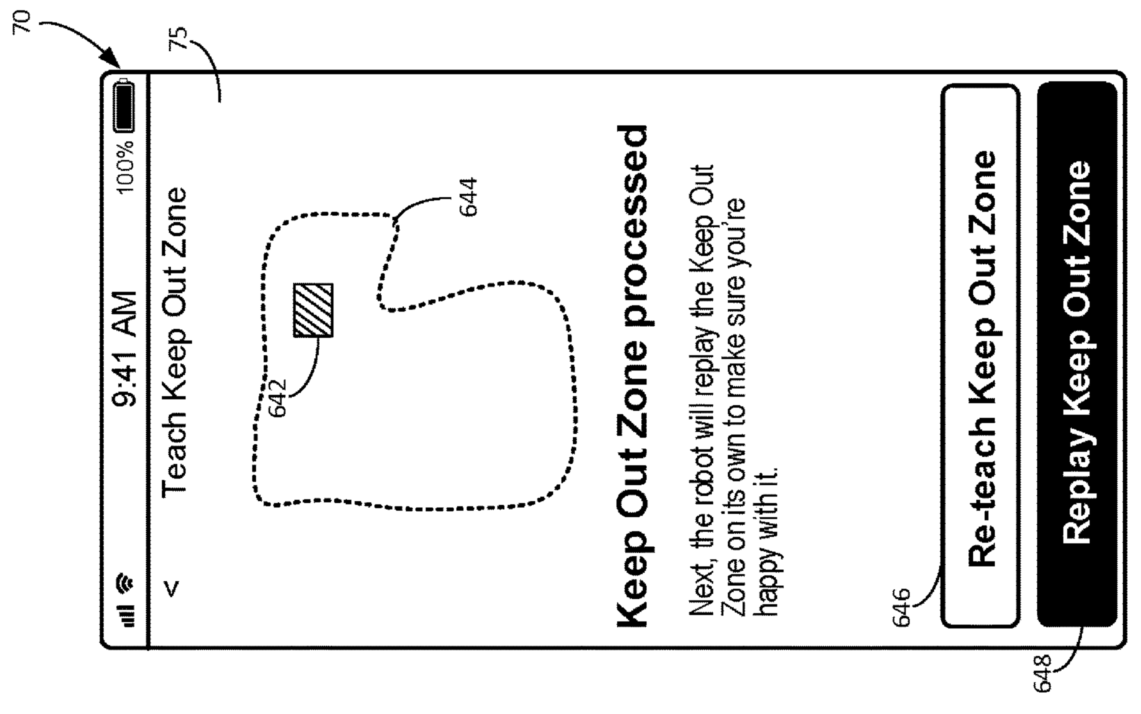

FIGS. 13A-13C are illustrations of the user interface 75 of the user device 70 during an example process of establishing a behavior control zone in which the user 60 guides the robotic lawnmower 200 along the desired perimeter of the behavior control zone. In the example of FIGS. 13A-13C, the behavior control zone is a keep out zone. In FIG. 13A, the user device 70 presents a button 630 that the user 60 can invoke in order to initiate the process for selecting the behavior control zone. In response to the button 630 being invoked, as shown in FIG. 13B, the user device 70 provides an instruction 632 indicating that the robotic lawnmower 200 should be driven around the desired perimeter for the keep out zone. The instruction 632 further indicates that the robotic lawnmower 200 is recording data indicative of the keep out zone. The user device 70 also provides an indicator 634 of a current battery level of the robotic lawnmower 200 and an indicator 636 of a quantity of beacons detected by the robotic lawnmower 200 at its current location. Referring also to FIG. 14, to teach the desired perimeter for the keep out zone, the robotic lawnmower 200 is driven along a path 650 about an obstacle, e.g., a garden 652. The user 60 can drive the robotic lawnmower 200 with a user device such as a remote control or can manually push the robotic lawnmower 200 along the path 650.

Referring back to FIG. 13B, the user device presents a button 638 that the user 60 can invoke in order to stop the recording of the data for the keep out zone. After the user 60 invokes the button 638, as shown in FIG. 13C, the user device 70 can present a visual representation 642 of the keep out zone overlaid on a visual representation 644 of the map of the mowable area 10. The user 60 can invoke a button 646 to re-teach the keep out zone, in which the user 60 maneuvers the robotic lawnmower 200 along a path around the obstacle again. The user 60 can also invoke button 648 to cause the robotic lawnmower 200 to move along the path 650 (shown in FIG. 14) again.

Referring back to FIG. 12, after a behavior control zone is selected, the user device 70 requests confirmation of the user-selected behavior control zone at the operation 612, and the user 60 confirms the selected behavior control zone at the operation 614. In some implementations, the user device 70 provides a representation of the user-selected behavior control zone so that the user 60 can visually verify the location and the geometry of the user-selected behavior control zone. In implementations in which the user 60 selects the behavior control zone by moving the robotic lawnmower 200 along the desired perimeter of the behavior control zone, sensor data collected by the robotic lawnmower 200 as the robotic lawnmower 200 is moved along the desired perimeter can be transmitted to the user device 70. These sensor data can be used by the user device 70 to present a visual representation of the user-selected behavior control zone. This visual representation of the user-selected behavior control zone can be overlaid on the visual representation of the map of the mowable area 10. The user device 70 can provide a message to the user 60 to request that the user 60 confirm the visual representation of the user-selected behavior control zone. The user 60 confirms the user-selected behavior control zone by providing a user input to the user device 70. In response to the user confirmation provided at the operation 614, at the operation 616, the user device transmits an instruction to establish the behavior control zone to the robotic lawnmower 200. This transmission can involve transmitting data indicative of the behavior control zone. In some implementations, if the robotic lawnmower 200 collected the sensor data as part of the user 60 selecting the behavior control zone at the operation 610, the transmission can involve a confirmation signal to indicate to the robotic lawnmower 200 that the previously collected sensor data is to be used as the basis for establishing the behavior control zone.

At the operation 618, the robotic lawnmower 200 establishes the behavior control zone in response to the instruction transmitted by the user device 70 at the operation 616. Data indicative of the behavior control zone can be generated and stored on the robotic lawnmower 200, the computing system 350, or both. The data indicative of the behavior control zone can be indicative of a location, a geometry, and/or a behavior associated with the behavior control zone.

The behavior controlled by the behavior control zone can vary in implementations. In some implementations, the behavior controlled by the behavior control zone can be a movement of the robotic lawnmower 200. For example, the behavior control zone, when entered by or encountered by the robotic lawnmower 200, can cause robotic lawnmower 200 to perform a movement behavior, such as an escape behavior, an avoidance behavior, or a follow behavior. For example, in the movement behavior, the robotic lawnmower 200 can move in a certain movement pattern within the behavior control zone, to move at a certain movement speed within the behavior control zone, to move away from the behavior control zone, or to move along a perimeter of the behavior control zone.

If the movement behavior is an escape behavior, entering or encountering the behavior control zone can indicate that the robotic lawnmower 200 is near obstacles that could cause the robotic lawnmower 200 to become stuck. The robotic lawnmower 200 can initiate movement in a manner to avoid becoming stuck by certain obstacles in the vicinity of the behavior control zone.

If the movement behavior is an avoidance behavior, the behavior control zone is a keep out zone. The robotic lawnmower 200 can move in a manner to avoid entering into an interior of the behavior control zone. Such movement can include reversing relative to the behavior control zone and then moving away from the behavior control zone. If the movement behavior is a follow behavior, the robotic lawnmower 200 can follow along the perimeter of the behavior control zone without entering into the interior of the behavior control zone.

In some implementations, the behavior controlled by the behavior control zone can be a parameter of a mowing operation of the robotic lawnmower 200. The parameter can be, for example, an amount of power delivered to the cutting assemblies 216, 218, an amount of power delivered to the wheel assemblies 202, 204, or a height of the cutting deck for the cutting assemblies. The behavior control zone can be, for example, a zone to disable the cutting assemblies 216, 218 of the robotic lawnmower 200. As the robotic lawnmower 200 moves through the behavior control zone, the cutting assemblies 216, 218 can be disabled. For example, the parameter can be a power delivered to the cutting assemblies 216, 218 of the robotic lawnmower 200, with the power being reduced to zero as the robotic lawnmower 200 moves through the behavior control zone. Alternatively or additionally, the parameter can be a cutting height of the cutting assemblies 216, 218, with the cutting height being raised such that the cutting assemblies 216, 218 do not contact the ground within the behavior control zone.

FIG. 15 illustrates a process 700 of setting a grass height to which the robotic lawnmower 200 cuts grass on the mowable area 10. The process 700 includes operations 702, 704, 706, 708, 710. In the process 700, the user device 70 can be operated by the user 60 to set a desired grass height, and then the user device 70 can provide data to the robotic lawnmower 200 to cause the robotic lawnmower 200 to move its cutting assemblies 216, 218 to a height that achieves the desired grass height.

The process 700 can begin with one or more operations that allows the user 60 to select a desired grass height using the user device 70. At the operation 702, the user device 70 presents a request to the user 60 to select a desired grass height. At the operation 704, the user 60 provides an instruction indicative of a user-selected grass height. Referring also to FIG. 16, the user device 70 can present on its user interface 75 a slide bar indicator 720 including an indicator 722 of a current selection for the user-selected grass height and a bar indictor 724 indicating a range of selectable grass heights. The user device 70 can further present a numerical indicator 726 of the user-selected height. The user 60 can operate the user interface 75 to move the indicator 722 relative to the bar indicator 724 to select a grass height within the range of selectable grass heights indicated by the bar indicator 724.

Referring back to FIG. 15, the process 700 can proceed with one or more operations to transmit instructions to the robotic lawnmower 200 to cause the robotic lawnmower 200 to move its cutting assemblies 216, 218 to a height corresponding to the user-selected grass height. For example, at the operation 706, the user device 70 transmits data indicative of the user-selected grass height to the computing system 350, and at the operation 708, the computing system 350 transmits data indicative of the user-selected grass height to the robotic lawnmower 200. The robotic lawnmower 200, at the operation 710, moves a cutting element to a height corresponding to the user-selected grass height selected by the user 60 at the operation 704. For example, the robotic lawnmower 200 can adjust heights of its cutting assemblies 216, 218 by operating a motor to move the cutting deck supporting the cutting assemblies 216, 218. Then, the robotic lawnmower 200 can initiate a mowing operating and cut grass on the mowable area 10 while the cutting assemblies 216, 218 are at the heights corresponding to the user-selected grass height.

Figure 17:
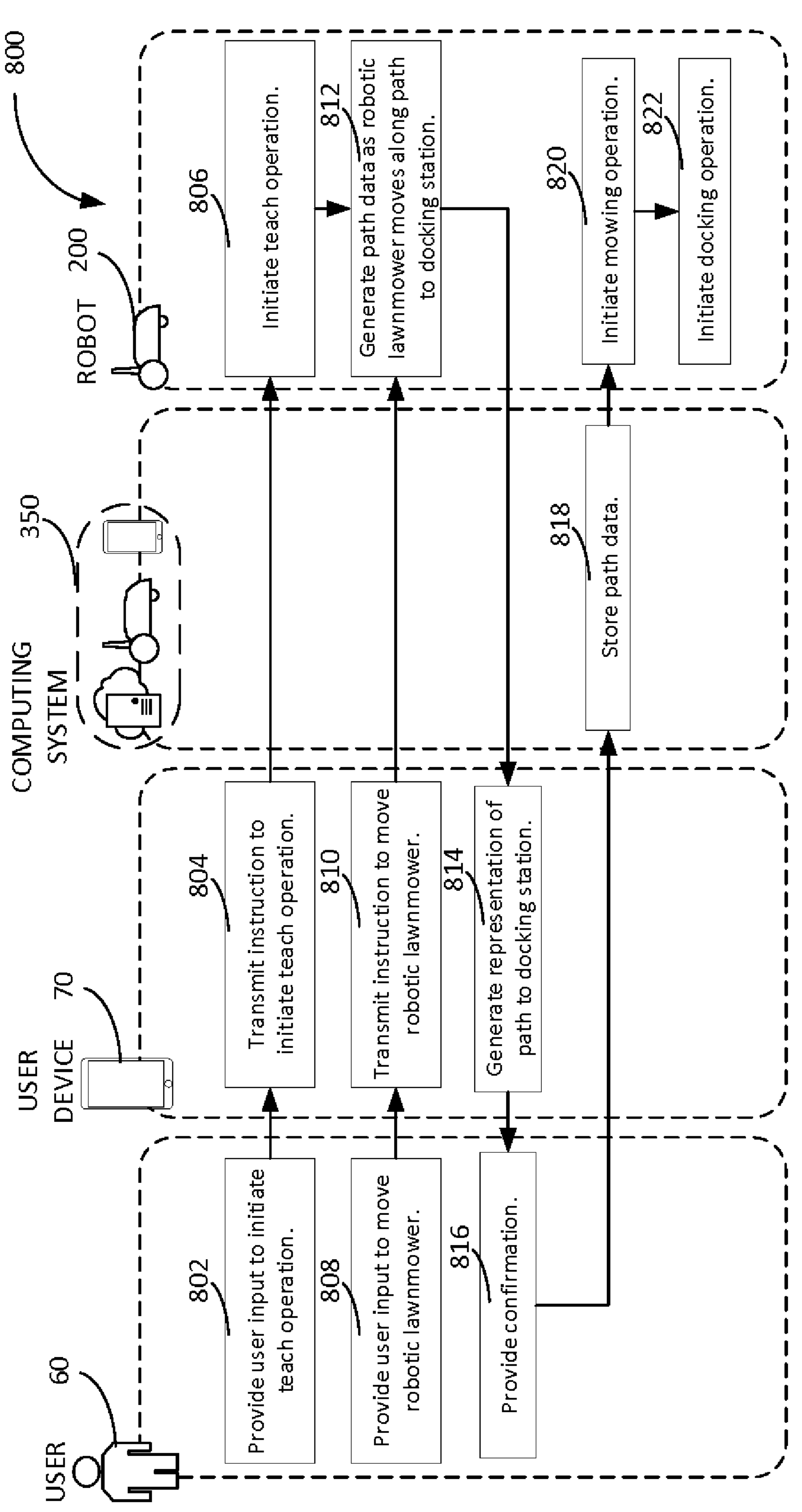
FIG. 17 is a flowchart of a process of teaching a path along which an autonomous robotic lawnmower moves to dock with a docking station.

FIG. 17 illustrates a process 800 for teaching a path along which the robotic lawnmower 200 moves to dock with the docking station 100. The process 800 includes operations 802, 804, 806, 808, 810, 812, 814, 816, 818, 820, and 822. In the process 800, the robotic lawnmower 200 is taught a path for docking with the docking station 100. The robotic lawnmower 200 docks with the docking station 100 during docking operations in order to charge the robotic lawnmower 200. The taught path by the robotic lawnmower 200 can be used during its docking operations so that the robotic lawnmower 200 can approach the docking station 100 in a way that facilitates successful docking with the docking station 100. For example, the guide mechanism 104 can more easily guide the robotic lawnmower 200 to a docking position when the robotic lawnmower 200 approaches the docking station 100 from a particular angle with respect to the docking station 100, e.g., an angle between a longitudinal axis of the robotic lawnmower 200 and a longitudinal axis of the docking station 100 being between 0 and 30 degrees. The process 800 can provide a path for the robotic lawnmower 200 that allows the robotic lawnmower 200 to approach the docking station 100 at such an angle.

The process 800 can begin with one or more operations to initiate the teach operation for the robotic lawnmower 200. At the operation 802, the user 60 provides a user input to initiate a teach operation. The user 60 can provide the user input to the user device 70. At the operation 804, the user device can transmit an instruction, to the robotic lawnmower 200, to initiate the teach operation. And at the operation 806, the robotic lawnmower 200 initiates the teach operation. In initiating the teach operation, the robotic lawnmower 200 can initiate collection of sensor data indicative of the path along which the robotic lawnmower 200 is moved during the teach operation. The robotic lawnmower 200 can initiate the teach operation after it is positioned at a start point for the desired path to the docking station 100. For example, referring also to FIG. 18A, the user device 70 can present a button 830 that the user 60 can invoke in order to initiate the teach operation. The user device 70 also provides an indicator 831 of a current battery level of the robotic lawnmower 200 and an indicator 833 of a quantity of beacons detected by the robotic lawnmower 200 at its current location.

Figure 19:
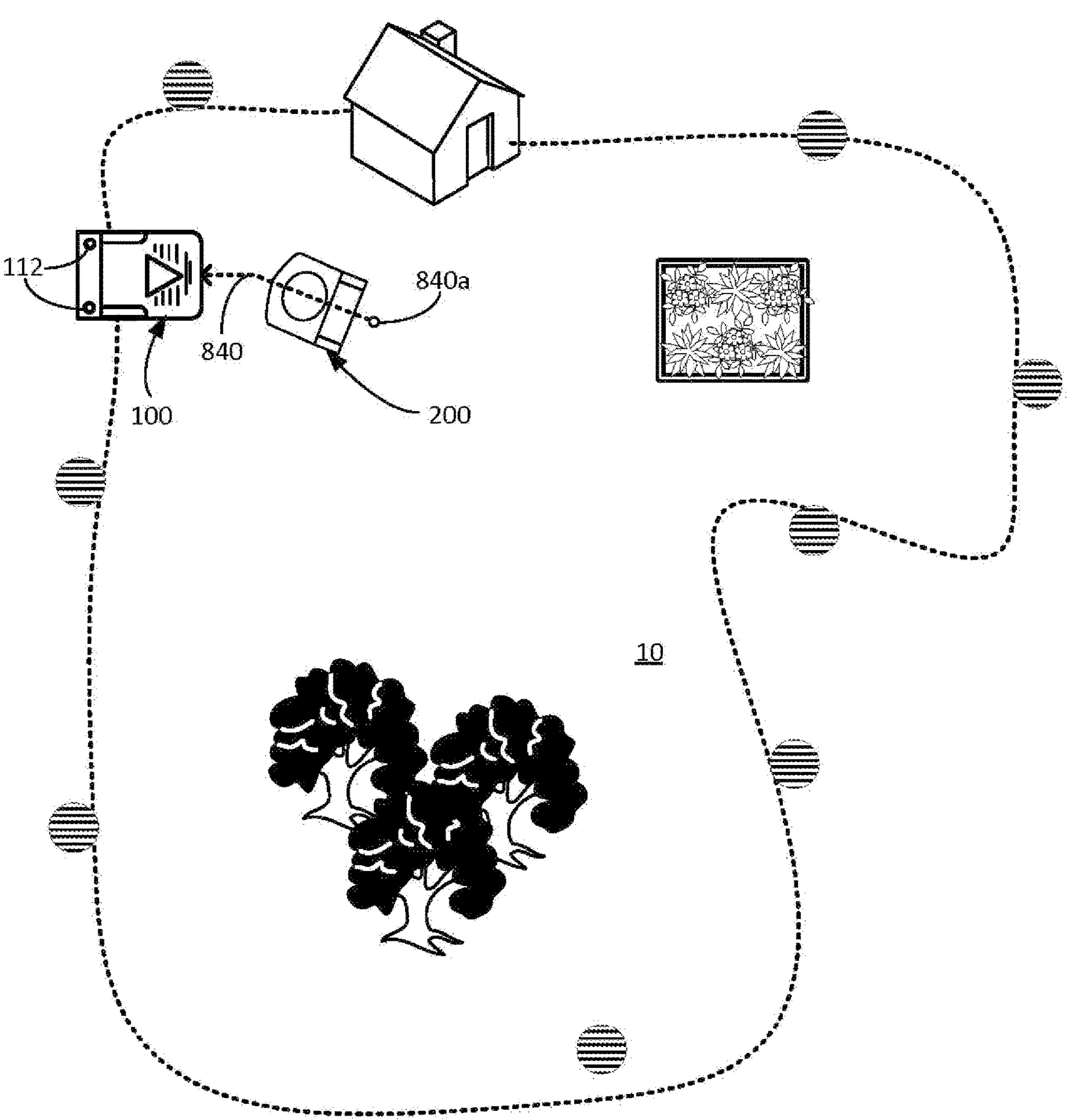
FIG. 19 is a top view of an environment during a process of teaching a path along which an autonomous robotic lawnmower moves to dock with a docking station.

Before invoking the button 830, referring also to FIG. 19, the user 60 can place the robotic lawnmower 200 at a desired start point 840*a* for a path 840 to the docking station 100. The robotic lawnmower 200 can then initiate the teach operation while positioned at the desired start point 840*a*. In some implementations, the start point 840*a* is positioned at least a threshold distance from a perimeter of the mowable area 10. In some implementations, the start point 840*a* is positioned at least, for example, 1 meter, 2 meters, or 3 meters away from the perimeter of the mowable area 10 and/or the perimeter of any behavior control zones.

The process 800 can proceed with one or more operations to move the robotic lawnmower 200 along a path for docking with the docking station 100. At the operation 808, the user 60 provides a user input to move the robotic lawnmower 200. In the example depicted in FIG. 17, the user 60 provides the user input to the user device 70, which in turn, at the operation 810, transmits an instruction to move the robotic lawnmower 200. For example, as described herein, the user device 70 can be used to remotely control movement of the robotic lawnmower 200. In further implementations, rather than being controlled by the user device 70, the robotic lawnmower 200 can be physically steered by the user 60 along the path 840.

Figures 18A, 18B:
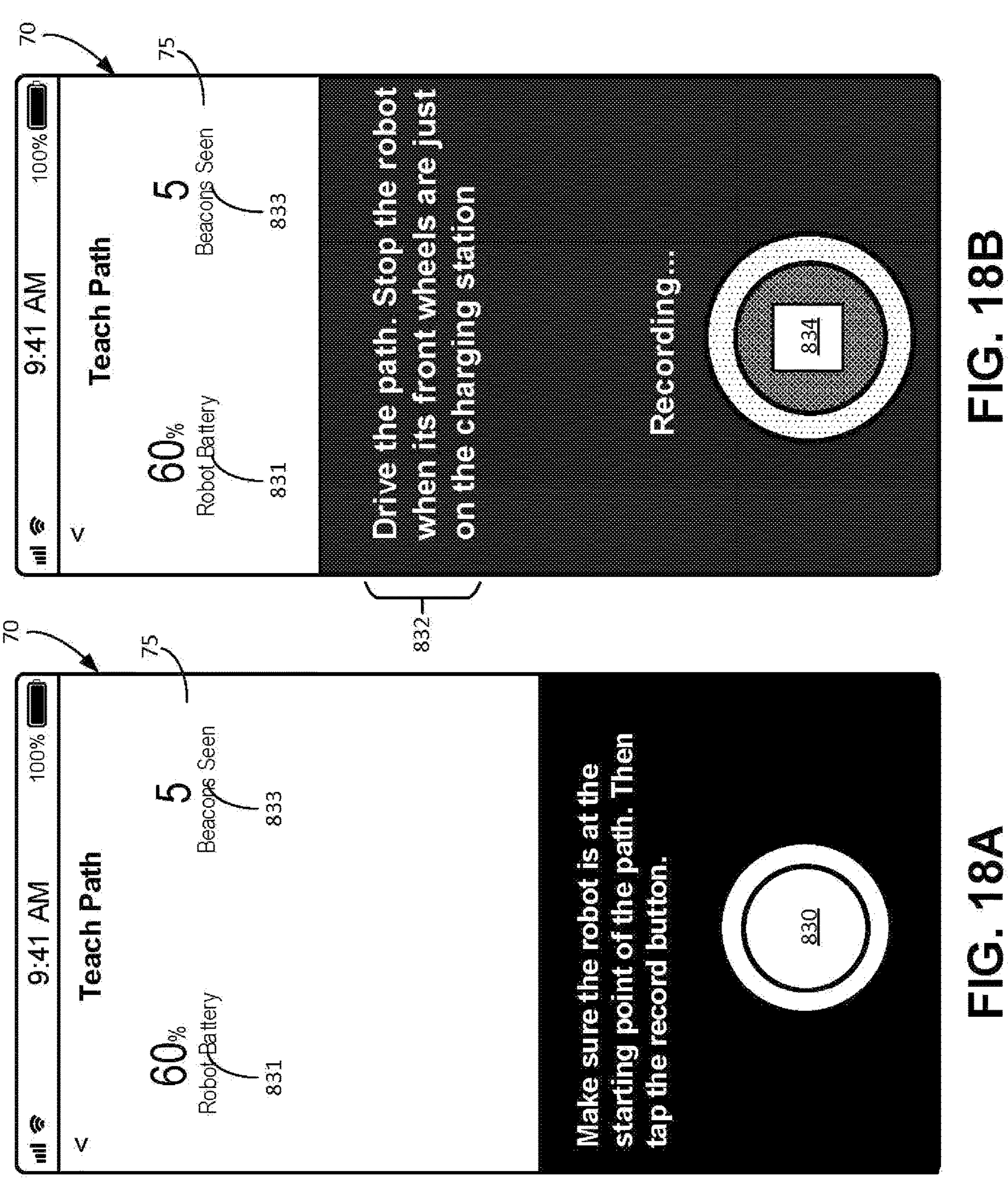
FIGS. 18A-18C are illustrations of a user interface during a process of teaching a path along which an autonomous robotic lawnmower moves to dock with a docking station.

At the operation 812, the robotic lawnmower 200 generates path data as the robotic lawnmower 200 moves along the path to the docking station 100. Referring also to FIG. 18B, the user device 70 can present a message 832 indicating that the robotic lawnmower 200 is collecting data indicative of the docking path for the robotic lawnmower 200. The path data can be indicative of the path 840, including the start point 840*a*. The user 60 can invoke a button 834 to stop the teaching operation when the robotic lawnmower 200 is positioned on or proximate to the docking station 100. Referring also to FIG. 19, during the teach operation, the robotic lawnmower 200 is moved along the desired path 840 until the robotic lawnmower 200 is positioned on or proximate to the docking station 100. The path 840 followed by the robotic lawnmower 200 can be represented by the sensor data collected by the robotic lawnmower 200 as the robotic lawnmower 200 moves along the path 840. In some implementations, the cutting assemblies 216, 218 of the robotic lawnmower 200 are disabled during the teach operation. In some implementations, at least a portion of the path 840 is straight, e.g., at least 1 meter, 1.5 meters, or 2 meters of the path 840 is straight.

After the user 60 invokes the button 834 shown in FIG. 18B to terminate the teach operation, the user device 70 at the operation 814 generates a representation of the path 840 to the docking station 100. For example, referring also to FIG. 18C, the path data generated by the robotic lawnmower 200 at the operation 812 can be transmitted to the user device 70, and the user device 70 can generate a representation 836 of the path 840 to the docking station 100 based on these data. The representation 836 of the path 840 to the docking station 100 can be overlaid on the representation 838 of the map of the mowable area 10, e.g., generated according to processes described herein.

Figure 18C:
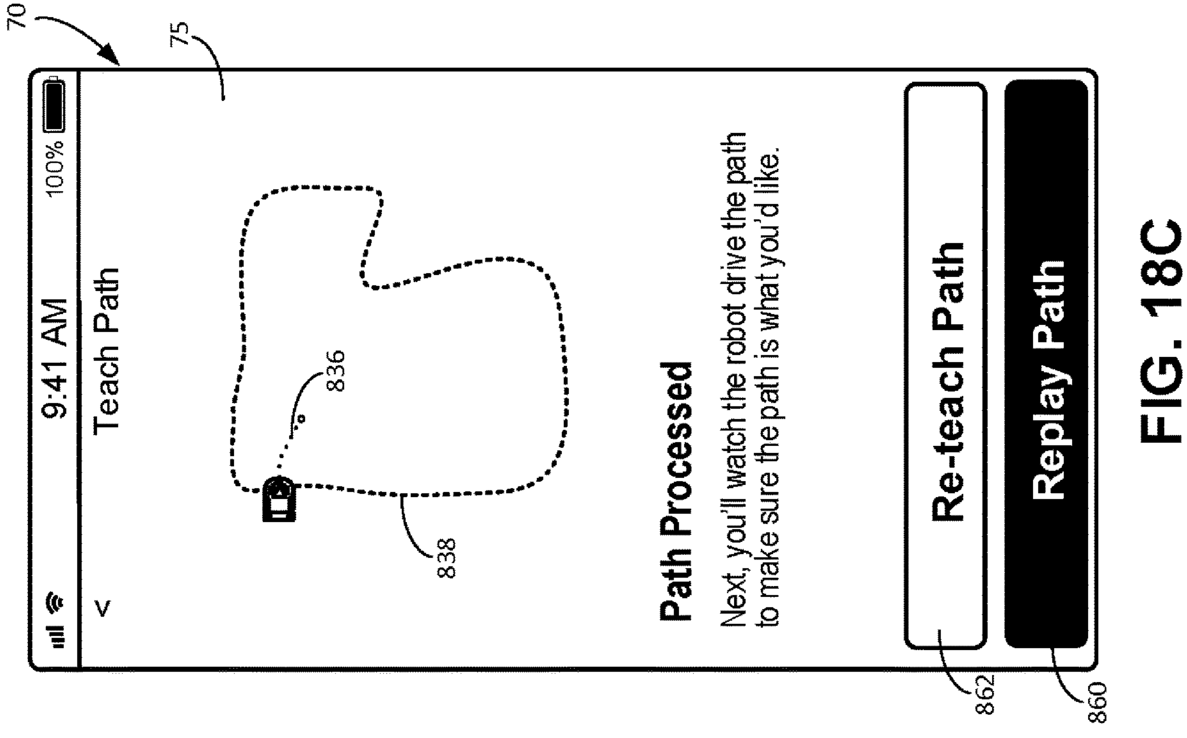

The process 800 can proceed with one or more operations for user confirmation of the path 840. For example, referring to FIG. 17, at the operation 816, the user 60 can provide confirmation of the path 840 of the robotic lawnmower 200. The user 60 can provide the confirmation to the user device 70. In some implementations, the robotic lawnmower 200 can autonomously move along the path 840 again, e.g., in response to the user 60 invoking a button 860 as shown in FIG. 18C. The user 60 can view the representation 836 of the path 840 and can also view the movement pattern of the robotic lawnmower 200 to confirm that the user 60 would like to use the user-selected path 840 for the robotic lawnmower 200. In some implementations, the user 60 may choose to re-teach a new docking path for the robotic lawnmower 200, and can thus repeat the operations described herein for teaching the docking path. The user 60 can invoke a button 862 as shown in FIG. 18C to initiate a further teach operation for teaching another docking path. After the user 60 provides the confirmation, at the operation 818, the computing system 350 stores the path data in response to receiving the user confirmation. In some implementations, these path data can be stored on the robotic lawnmower 200 itself.

The stored path can be used during docking operations of the robotic lawnmower 200. For example, at the operation 820, the robotic lawnmower 200 initiates a mowing operation to autonomous cut grass on the mowable area 10. At the operation 822, the robotic lawnmower 200 initiates a docking operation. The robotic lawnmower 200 can initiate the docking operation in response to a power level of the robotic lawnmower 200 falling below a threshold power level. The threshold power level can be between, for example, 5% to 15%, 10% to 20%, or 15% to 25%. In some implementations, the threshold power level can be selected by the user 60, e.g., using the user device 70. During the docking operation, the robotic lawnmower 200 can use the path data to follow the path 840 that was taught during the teach operation. The robotic lawnmower 200 can navigate to the start point 840*a* and then follow the path 840 to dock with the docking station 100.

FURTHER ALTERNATIVE IMPLEMENTATIONS

A number of implementations have been described. Nevertheless, it will be understood that various modifications may be made.

The communication network 301 can vary in implementations. In some implementations, can include additional autonomous mobile robots. For example, the communication network can include additional robotic lawnmowers that can perform processes and operations as described herein. Data collected by the robotic lawnmower 200 can be used by other robotic lawnmowers. For instance, the behavior control zones generated as part of the process 600 for the robotic lawnmower 200 can also be used to control behaviors of other robotic lawnmowers that are part of the communication network. The docking path taught for the robotic lawnmower 200 as part of the process 800 can also be used by other robotic lawnmowers that are part of the communication network 301. In addition, the representations of the maps presented on the user device 70 can be generated based on data collected by the robotic lawnmower 200 as well as other robotic lawnmowers that are part of the communication network 301.

In some implementations, the communication between the devices in the communication network 301 can vary. Devices can communicate with other devices through direct communication links, through indirect links with intermediary devices, or through a combination of direct and indirect links. For example, while the user device 80 is depicted as being in direct communication with the robotic lawnmower 200, in some implementations, the user device 80 can communicate with the robotic lawnmower 200 through the remote computing system 192, or through some other intermediary device. The user device 70 is depicted as being in communication with the robotic lawnmower 200 through the remote computing system 192, but in other implementations, the user device 70 can communicate with the robotic lawnmower 200 both indirectly and directly.

While the processes 400, 500, 600, 700, 800 are described with respect to the user device 70, in other implementations, other types of user devices and additional user devices can perform operations that are part of these processes. For example, operations described as being performed by the user device 70 can be performed by another user device, e.g., the user device 80, a remote control, a desktop computer, a laptop computer, an augmented reality user device, a virtual reality user device, or another user computing device. Some operations can be performed by two or more user devices. For example, certain households or environments may have multiple user devices (e.g., multiple user devices used by a single user or multiple user devices used by multiple users) that can control and monitor the operations of the robotic lawnmower 200.

Certain indicators presented by the user device 70 are described as being visual indicators. In some implementations, the indicators can be tactile, audible, or a combination of tactile, audible, and visual indicators.

As described herein, the operations of the processes 400, 500, 600, 700, 800 are described as being performed by certain actors but can, in other implementations, be performed by other actors. For example, data remotely stored on the computing system 350 can, instead, be stored on the robotic lawnmower 200, on the user device 70, or on a combination of both the robotic lawnmower 200 and the user device 70.

The process 400 is described as providing representations of potential shapes of a mowable area. In some implementations, the user device 70 presents a representation of an actual shape of the mowable area 10, and then provides a recommendation for beacon locations for the shape of the mowable area 10. For example, the robotic lawnmower 200 can be controlled to move about the mowable area 10 to generate mapping data indicative of the shape of the mowable area 10. The mapping data then can be used by the user device 70 to present a representation of a map of the mowable area 10. The recommended beacon locations can be represented as indicators that are overlaid on the representation of the map of mowable area 10.

In some implementations, the potential shape of a mowable area can be selected by the user 60. For example, the user 60 can draw the representation of the potential shape of the mowable area, e.g., using a touchscreen or other user input device, and then the user device 70 can present the indicators the recommended locations of the beacons based on the user-selected representation of the potential shape of the mowable area. In some implementations, the user device 70 can provide an example representation of the potential shape, and the user 60 can provide the input to change a geometry or size of the potential shape.

While the process 500 is described with respect to the operations 504, 506 in which the user 60 provides a command to cause the robotic lawnmower 200 to move, the robotic lawnmower 200 can be navigated about the mowable area 10 in other ways. In some implementations, the command corresponds to a command that causes the robotic lawnmower 200 to autonomously move about the mowable area 10. For example, the autonomous robotic lawnmower 200 can move about the mowable area 10 until the robotic lawnmower 200 moves to a location in which the robotic lawnmower 200 does not detect the threshold quantity of beacons.

In some implementations, the user 60 can select a location on a representation of a map of the mowable area 10, and the user device 70 reports a quantity of beacons detected by the robotic lawnmower 200 at a corresponding location on the mowable area 10. In some implementations, the user device 70 can present a representation of a color-coded map of the mowable area 10. Colors on this representation of the color-coded map can indicate a quantity of beacons detected by the robotic lawnmower 200 at various locations on the mowable area 10.

While the process 500 is described with respect to a test operation for the robotic lawnmower 200, in some implementations, the indicators provided as part of the process 500 can be provided during a mowing operation or other operation of the robotic lawnmower 200. For example, as the robotic lawnmower 200 moves about the mowable area 10 during a mowing operation, the user 60 can operate the user device 70 to determine the quantity of beacons that the robotic lawnmower 200 at its current position during the mowing operation.

The process 600 for establishing behavior control zones can vary in implementations. Behavior control zones can be established before or after mowing operations are performed by the robotic lawnmower 200. In some implementations, the behavior control zones can be recommended and established after a test operation and a boundary training operation are performed, and before the mowing operation. In some implementations, sensor data collected during the mowing operation can serve as the basis for a recommendation for establishing a behavior control zone.

The process 600 is described as being used to establish a user-selected behavior control zone. In some implementations, the user-selected behavior control zone can be selected based on a recommended behavior control zone that is recommended by the computing system 350. Sensor data collected by the robotic lawnmower 200 can be used to provide a recommended behavior control zone, and the user 60 can accept or modify the recommended behavior control zone to define a behavior control zone for controlling the behavior of the robotic lawnmower 200. For example, the user device 70 can present on the user interface 75 a representation of a recommended behavior control zone overlaid on a representation of a map of the mowable area 10 (e.g., similar to the representation 642 of the behavior control zone and the representation of the mowable area 10 of FIG. 13C).

The recommended behavior control zone can be selected in a number of ways. In a process of providing a recommended behavior control zone, the robotic lawnmower 200 can generate mapping data as part of a test operation or a mowing operation. The mapping data can be indicative of sensor events that occurred during the test operation or the mowing operation. A subset of the sensor events can be identified based on locations of the sensor events. A sensor event can occur when one or more sensors of the sensor system of the robotic lawnmower 200 are triggered. A feature in the environment can be associated with the sensor event. A location of a sensor event can correspond to a location of the robotic lawnmower 200 when the sensor event occurs, or can correspond to a location of the feature detected by the sensor of the robotic lawnmower 200 for which the sensor event has occurred.

The feature detected by the sensor of the robotic lawnmower 200 can vary in implementations. In some implementations, the feature detected by the sensor of the robotic lawnmower 200 can correspond to an object on the mowable area 10. The object can be an obstacle. In such examples, the sensor events are obstacle detection events in which one or more sensors of the robotic lawnmower 200 is triggered. The obstacle can define nontraversable space on the mowable area 10, i.e., a portion of the mowable area 10 that the robotic lawnmower 200 cannot move across due to the presence of the object. The obstacle could be, for example, a lawn fixture, a garden, a fountain, or other obstacle in the environment that could impede movement of the robotic lawnmower 200.

The sensors that generate the sensor events for providing the recommended behavior control zone can vary in implementations. For example, if the robotic lawnmower 200 includes a bump sensor, a sensor event can occur when the bump sensor is triggered. A location of the sensor event can correspond to a location of the robotic lawnmower 200 when the bump sensor is triggered, or can correspond to a location of contact between the robotic lawnmower 200 and an object in the environment that triggers the bump sensor. In further examples, the sensor events can occur based on sensing performed by the proximity sensors, obstacle following sensors, encoders, drive assembly motors, or an odometer, or other sensors of the sensor system. In some implementations, multiple sensors can be involved in a sensor event.

The criteria for selecting the sensor events considered to be part of a subset used for recommending a behavior control zone can vary in implementations. In some implementations, only one criterion is used to identify the subset of sensor events. The criterion can be a threshold distance criterion, a threshold amount criterion, or other appropriate criteria. In some implementations, multiple criteria are used to identify the subset of sensor events, e.g., two or more criteria.

In some implementations, as part of the process 700 of selecting a desired grass height, the robotic lawnmower 200 can provide data indicative of a current grass height on the mowable area 10. The robotic lawnmower 200 can include a grass height sensor, e.g., an optical sensor, that can detect the height of the grass. The user device 70 can present an indicator of the current grass height based on data from the grass height sensor.

Examples described herein are described in connection with the mowable area 10. The shape, geometry, and size of the mowable area can vary in implementations. In some implementations, an environment can include multiple mowable areas on which the robotic lawnmower performs a mowing operation. The robotic lawnmower can move from one mowable area to another mowable area through an intermediate non-mowable area. The processes 400, 500, 600, 700, 800 can vary in examples in which the environment includes multiple mowable areas. For example, with respect to the process 400, recommended beacon locations can be separately provided for each mowable area, or can be provided for the combination of the mowable areas.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the user device, a cloud computing system configured to communicate with the user device and the autonomous robotic lawnmower, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and user devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

Accordingly, other implementations are within the scope of the claims.

What is claimed is:

1. A method comprising:

receiving, by a user device from an autonomous robotic lawnmower, mapping data collected by the autonomous robotic lawnmower as the autonomous robotic lawnmower is navigated about a lawn;

presenting, on a user interface of the user device, a representation of a map of the lawn based on the mapping data;

presenting, on the user interface, a representation of a recommended behavior control zone overlaid on the representation of the map of the lawn, wherein the recommended behavior control zone is recommended based on detection of an obstacle by the autonomous robotic lawnmower, wherein the obstacle is distinct from any beacons present at the lawn;

receiving, by the user device, a user input indicative of a modification of the recommended behavior control zone, to obtain a user-selected behavior control zone that is based on the recommended behavior control zone; and transmitting, by the user device to the autonomous robotic lawnmower, data indicative of the user-selected behavior control zone to cause the autonomous robotic lawnmower to initiate a behavior in response to encountering the user-selected behavior control zone as the autonomous robotic lawnmower navigates about the lawn, wherein the detection of the obstacle is a sensor event, and wherein the recommended behavior control zone is recommended based on a subset of a plurality of sensor events detected by the autonomous robotic lawnmower during a mowing operation or a test operation, the subset determined based on a criterion satisfied by the subset, wherein the criterion comprises a threshold distance criterion.

2. The method of claim 1, wherein the obstacle is detected using a bump sensor of the autonomous robotic lawnmower.

3. The method of claim 1, wherein the user-selected behavior control zone corresponds to a user-selected keep out zone, and the behavior is an avoidance behavior in which the autonomous robotic lawnmower avoids the user-selected keep out zone.

4. The method of claim 1, wherein the user input comprises a user selection of a portion of the representation of the map of the lawn.

5. The method of claim 4, wherein the user selection of the portion of the representation of the map of the lawn is a user selection of a perimeter of the user-selected behavior control zone.

6. The method of claim 1, wherein the behavior comprises a movement behavior according to which the autonomous robotic lawnmower moves within the user-selected behavior control zone.

7. The method of claim 6, wherein the movement behavior comprises a perimeter-following behavior in which the autonomous robotic lawnmower follows a perimeter of the user-selected behavior control zone without entering into an interior of the user-selected behavior control zone.

8. The method of claim 6, wherein the movement behavior comprises a speed with which the autonomous robotic lawnmower moves within the user-selected behavior control zone.

9. The method of claim 1, wherein the behavior comprises at least one of an amount of power for the autonomous robotic lawnmower to use for cutting or a height of a blade of the autonomous robotic lawnmower.

10. The method of claim 1, wherein the behavior comprises an amount of power delivered to a wheel assembly of the autonomous robotic lawnmower.

11. The method of claim 1, wherein the detection of the obstacle occurs during a prior mowing operation of the autonomous robotic lawnmower.

12. The method of claim 1, wherein the obstacle comprises a drop-off, a cliff, a lawn fixture, a garden, or a fountain.

13. The method of claim 1, comprising determining the subset of the plurality of sensor events based on respective locations of the plurality of sensor events.

14. A system comprising:

one or more processors, and one or more non-transitory machine-readable storage media storing instructions that, when executed by the one or more processors, cause the one or more processors to perform operations comprising:

receiving, by a user device from an autonomous robotic lawnmower, mapping data collected by the autonomous robotic lawnmower as the autonomous robotic lawnmower is navigated about a lawn;

presenting, on a user interface of the user device, a representation of a map of the lawn based on the mapping data;

presenting, on the user interface, a representation of a recommended behavior control zone overlaid on the representation of the map of the lawn, wherein the recommended behavior control zone is recommended based on detection of an obstacle by the autonomous robotic lawnmower, wherein the obstacle is distinct from any beacons present at the lawn;

receiving, by the user device, a user input indicative of a modification of the recommended behavior control zone, to obtain a user-selected behavior control zone that is based on the recommended behavior control zone; and transmitting, by the user device to the autonomous robotic lawnmower, data indicative of the user-selected behavior control zone to cause the autonomous robotic lawnmower to initiate a behavior in response to encountering the user-selected behavior control zone as the autonomous robotic lawnmower navigates about the lawn, wherein the detection of the obstacle is a sensor event, and wherein the recommended behavior control zone is recommended based on a subset of a plurality of sensor events detected by the autonomous robotic lawnmower during a mowing operation or a test operation, the subset determined based on a criterion satisfied by the subset, wherein the criterion comprises a threshold distance criterion.

15. The system of claim 14, wherein the obstacle is detected using a bump sensor of the autonomous robotic lawnmower.

16. The system of claim 14, wherein the user-selected behavior control zone corresponds to a user-selected keep out zone, and the behavior is an avoidance behavior in which the autonomous robotic lawnmower avoids the user-selected keep out zone.

17. The system of claim 14, wherein the user input comprises a user selection of a portion of the representation of the map of the lawn.

* * * * *